US008605066B2

(12) United States Patent
Yamamoto et al.

(10) Patent No.: US 8,605,066 B2

(45) Date of Patent: Dec. 10, 2013

(54) DISPLAY APPARATUS INCLUDING DISPLAY PIXELS AND LIGHT DETECTION UNITS, METHOD FOR CONTROLLING LIGHT DETECTION OPERATION

(75) Inventors: Tetsuro Yamamoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 682 days.

(21) Appl. No.: 12/662,307

(22) Filed: Apr. 9, 2010

(65) Prior Publication Data

US 2010/0289831 A1 Nov. 18, 2010

(30) Foreign Application Priority Data

May 12, 2009 (JP) ................................ 2009-115194

(51) Int. Cl.

| | |
|---|---|
| ***G06F 3/038*** | (2013.01) |
| ***G09G 5/00*** | (2006.01) |
| ***G09G 3/30*** | (2006.01) |
| ***G09G 5/10*** | (2006.01) |

(52) U.S. Cl.

USPC .............................. 345/207; 345/77; 345/690

(58) Field of Classification Search

USPC .............................. 345/76–81, 207, 690–697

See application file for complete search history.

(56) References Cited

U.S. PATENT DOCUMENTS

| | | | | |
|---|---|---|---|---|
| 6,720,942 | B2 * | 4/2004 | Lee et al. | 345/82 |
| 2006/0262055 | A1 * | 11/2006 | Takahara | 345/81 |
| 2007/0046593 | A1 * | 3/2007 | Shin | 345/81 |
| 2009/0231313 | A1 * | 9/2009 | Teranishi et al. | 345/207 |
| 2010/0177075 | A1 * | 7/2010 | Fish et al. | 345/207 |

FOREIGN PATENT DOCUMENTS

| | | |
|---|---|---|
| JP | 2007-5019543 | 2/2007 |
| JP | 2008-518263 | 5/2008 |
| WO | WO-2005/015530 | 2/2005 |
| WO | WO-2006/046196 | 5/2006 |

* cited by examiner

*Primary Examiner* — Bipin Shalwala

*Assistant Examiner* — Ryan A Lubit

(74) *Attorney, Agent, or Firm* — Rader, Fishman & Grauer PLLC

(57) ABSTRACT

Disclosed herein is a display apparatus, including: pixel circuits disposed in a matrix at positions at which a plurality of signal lines and scanning lines cross each other and each including a light emitting element; a light emission driving section adapted to apply a signal value to each of the pixel circuits; a light detection section having a light sensor; a correction information production section adapted to detect the light detection information outputted to the light detection line and supply information for correction of the signal value corresponding to a result of the detection to the light emission driving section; and an initialization control section adapted to set all nodes of the detection signal outputting circuit to an equal potential within a period in which the light detection section does not carry out the light detection operation.

16 Claims, 17 Drawing Sheets

DISPLAY APPARATUS INCLUDING DISPLAY PIXELS AND LIGHT DETECTION UNITS, METHOD FOR CONTROLLING LIGHT DETECTION OPERATION

BACKGROUND OF THE INVENTION

1. Field of the Invention

The present invention relates to a display apparatus wherein a self-luminous device such as, for example, an organic electroluminescence device (organic EL device) is used in a pixel circuit and a method for controlling a light detection operation of a light detection section provided in the pixel circuit.

2. Description of the Related Art

In a display apparatus of the active matrix type wherein an organic electroluminescence (EL: Electroluminescence) light emitting element is used as a pixel, current flowing to a light emitting element in each pixel circuit is controlled by an active device, generally a thin film transistor (TFT) provided in each pixel circuit. Since an organic EL device is a current light emitting element, a gradation of color development is obtained by controlling the amount of current flowing to the EL device.

In particular, in a pixel circuit which includes an organic EL device, current corresponding to an applied signal value voltage is supplied to the organic EL device to carry out light emission of a gradation in accordance with the signal value.

In a display apparatus which uses a self-luminous device such as a display apparatus which uses such an organic EL device as described above, it is important to cancel the dispersion in light emission luminance among pixels to eliminate non-uniformity which appears on a screen.

While the dispersion in light emission luminance among pixels appears also in an initial state upon panel fabrication, the dispersion is caused by time-dependent variation.

A light emission efficiency of an organic EL device is degraded by passage of time. In particular, even if the same current flows, the emitted light luminance degrades together with passage of time.

As a result, a screen burn that, if a white WINDOW pattern is displayed on the black background and then the white is displayed on the full screen as shown, for example, in FIG. 17A, then the luminance at the portion at which the WINDOW pattern is displayed decreases.

A countermeasure against such a situation as described above is disclosed in JP-T-2007-501953 or JP-T-2008-518263 (referred to as Patent Documents 1 and 2, respectively, hereinafter). In particular, Patent Document 1 discloses an apparatus wherein a light sensor is disposed in each pixel circuit and a detection value of the light sensor is fed back to the system to correct the emitted light luminance. Patent Document 2 discloses an apparatus wherein a detection value is fed back from a light sensor to a system to carry out correction of the emitted light luminance.

SUMMARY OF THE INVENTION

The present invention provides a light detection section for detecting light from a light emitting element of a pixel circuit in the pixel circuit. The display apparatus is premised wherein a signal value is corrected in accordance with light amount information detected by the light detection section to prevent such a screen burn as described above. The present invention further provides a light detection section which can carry out detection with a high degree of accuracy.

According to an embodiment of the present invention, there is provided a display apparatus including a plurality of pixel circuits, a light emission driving section, a light detection section, a correction information production section, and an initialization control section. The plurality of pixel circuits are disposed in a matrix at positions at which a plurality of signal lines and a plurality of scanning lines cross each other and each including a light emitting element. The light emission driving section is adapted to apply a signal value to each of the pixel circuits so as to emit light of a gradation corresponding to the signal value. The light detection section includes a light sensor for detecting light from the light emitting element of each of the pixel circuits and having a detection signal outputting circuit formed therein for outputting light detection information by the light sensor to a light detection line. The correction information production section is adapted to detect the light detection information outputted to the light detection line and supply information for correction of the signal value corresponding to a result of the detection to the light emission driving section. The initialization control section is adapted to set all nodes of the detection signal outputting circuit to an equal potential within a period in which the light detection section does not carry out the light detection operation.

According to another embodiment of the present invention, there is provided a control method for a light detection operation of a display apparatus. The display apparatus includes a plurality of pixel circuits, a light emission driving section, a light detection section, and a correction information production section. The plurality of pixel circuits are disposed in a matrix at positions at which a plurality of signal lines and a plurality of scanning lines cross each other and each including a light emitting element. The light emission driving section is adapted to apply a signal value to each of the pixel circuits so as to emit light of a gradation corresponding to the signal value. The light detection section includes a light sensor for detecting light from the light emitting element of each of the pixel circuits and having a detection signal outputting circuit formed therein for outputting light detection information by the light sensor to a light detection line. The correction information production section is adapted to detect the light detection information outputted to the light detection line and supply information for correction of the signal value corresponding to a result of the detection to the light emission driving section. The control method includes the step of setting all nodes of the detection signal outputting circuit to an equal potential within a period within which the light detection section does not carry out the light detection operation.

In the display apparatus and the control method for a light detection operation, it is possible to prevent a voltage from being applied to a transistor or transistors and the light sensor which compose the detection signal outputting circuit of the light detection section within a period in which the light detection section does not carry out a light detection operation.

With the display apparatus and the control method for a light detection operation, within a period in which the light detection section does not carry out the light detection operation, all nodes of the detection signal outputting circuit of the light detection section are set to an equal potential. Consequently, a voltage can be prevented from being applied to the transistor or transistors and the light sensor which compose the detection signal outputting circuit of the light detection section. Therefore, within a period in which light detection is not carried out, an electric characteristic of the transistor or transistors and the light detection element can be prevented from being varied. Accordingly, upon light detection operation, it is possible to detect light detection information and carry out feedback for correction of the signal value regularly, and consequently, uniform picture quality free from a screen burn can be obtained.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, embodiments of the present invention are described in the following order.

[1. Configuration of the Display Apparatus]

[2. Taken into Consideration in the Course to the Present Invention]

[3. Circuit Configuration of the Present Embodiment]

[4. Light Detection Operation Period]

[5. Light Detection Operation and Initial Operation]

[6. Modification]

[1. Configuration of the Display Apparatus]

Figure 1:
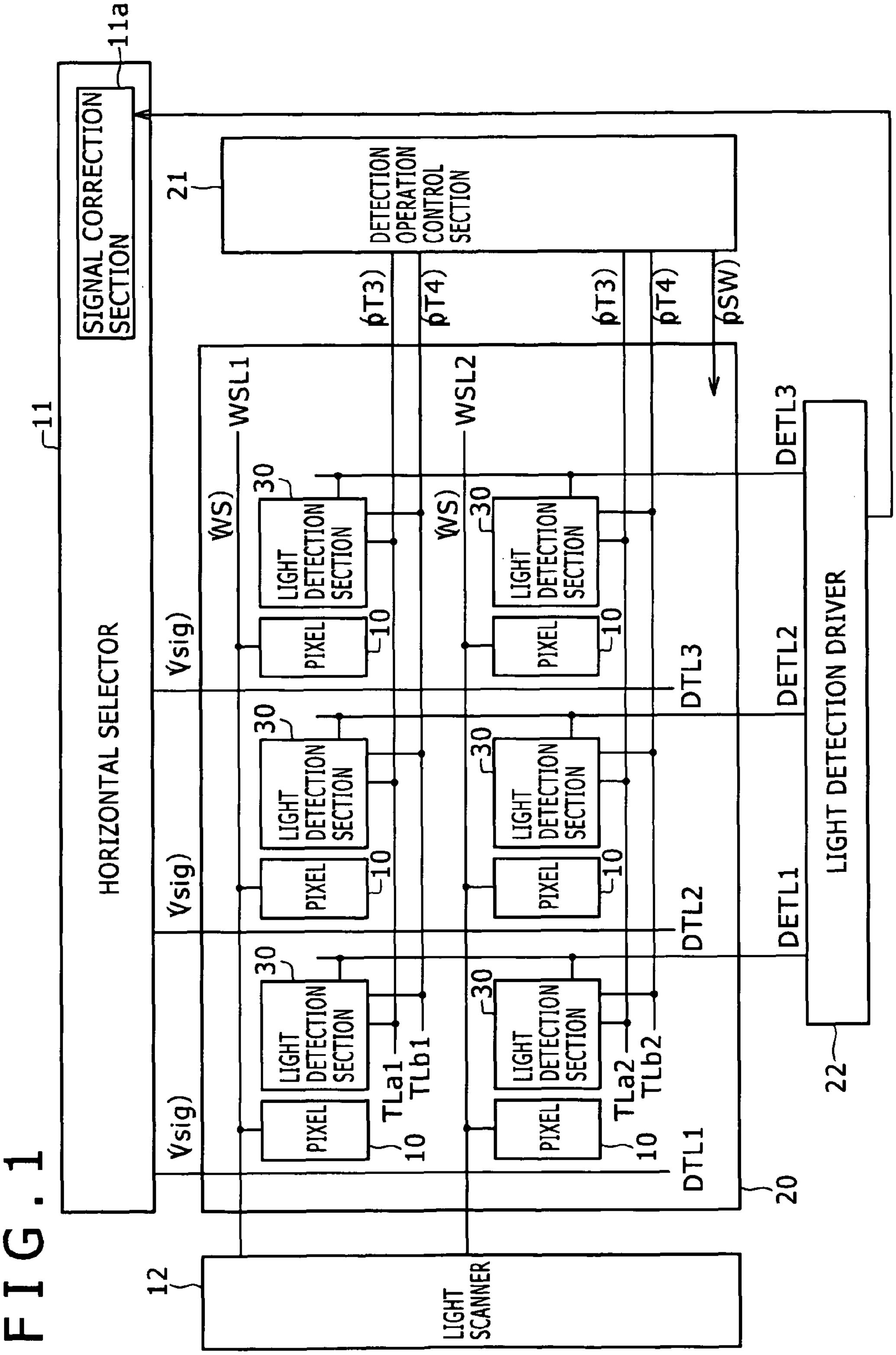
FIG. 1 is a block diagram showing a display apparatus according to an embodiment of the present invention.

A configuration of an organic EL display apparatus according to an embodiment of the present invention is shown in FIG. 1.

The organic EL display apparatus includes a plurality of pixel circuits 10 each including an organic EL device as a light emitting element for carrying out light emission driving in accordance with an active matrix method.

Referring to FIG. 1, the organic EL display apparatus includes a pixel array 20 wherein a great number of pixel circuits 10 are arranged in a matrix in a row direction and a column direction, that is, in m rows×n columns. It is to be noted that each of the pixel circuits 10 functions as one of light emitting pixels of R (red), G (green) and B (blue), and a color display apparatus is configured by arranging the pixel circuits 10 of the individual colors in accordance with a predetermined rule.

As components for driving the pixel circuits 10 to emit light, a horizontal selector 11 and a write scanner 12 are provided.

Signal lines DTL, particularly DTL1, DTL2, . . . , which are selected by the horizontal selector 11 for supplying a voltage in accordance with a signal value, that is, a gradation value, of a luminance signal as display data to the pixel circuits 10 are arranged in the column direction on the pixel array 20. The number of signal lines DTL1, DTL2, . . . is equal to the number of columns of the pixel circuits 10 disposed in a matrix in the pixel array 20.

Further, on the pixel array 20, writing control lines WSL, that is, WSL1, WSL2, . . . , are arranged in the row direction. The number of writing control lines WSL is equal to the number of the pixel circuits 10 disposed in a matrix in the row direction on the pixel array 20.

The writing control lines WSL, that is, WSL1, WSL2, . . . , are driven by the write scanner 12. The write scanner 12 successively supplies a scanning pulse WS to the writing control lines WSL1, WSL2, . . . disposed in rows to line-sequentially scan the pixel circuits 10 in a unit of a row.

The horizontal selector 11 supplies a signal value potential Vsig as an input signal to the pixel circuits 10 to the signal lines DTL1, DTL2, . . . disposed in the column direction in a timed relationship with the line-sequential scanning by the write scanner 12.

A light detection section 30 is provided corresponding to each of the pixel circuits 10. The light detection section 30 includes a light sensor in the inside thereof and a detection signal outputting circuit including the light sensor. The light detection section 30 outputs detection information of an emitted light amount of the light emitting element of the corresponding pixel circuit 10.

Further, a detection operation control section 21 for controlling operation of the light detection section 30 is provided. Control lines TLa, that is, TLa1, TLa2, . . . , and control lines TLb, that is, TLb1, TLb2, . . . , extend from the detection operation control section 21 to the light detection sections 30.

While a configuration of the detection signal outputting circuit of the light detection section 30 is hereinafter described, the control lines TLa function to supply a control pulse pT3 for on/off control of a first switching transistor T3 in the light detection sections 30 to the first switching transistor T3. Meanwhile, the control lines TLb function to supply a control pulse pT4 for on/off control of the second switching transistor T4 in the light detection sections 30 to the second switching transistor T4.

Further, light detection lines DETL, that is, DETL1, DETL2, . . . , are disposed, for example, in a column direction for the light detection section 30. The light detection lines DETL are used as lines for outputting a voltage as detection information by the light detection sections 30.

The light detection lines DETL, that is, DETL1, DETL2, . . . , are connected to a light detection driver 22. The light detection driver 22 carries out voltage detection regarding the light detection lines DETL to detect light amount detection information by the light detection sections 30.

The light detection driver 22 applies light amount detection information regarding the pixel circuits 10 by the light detection sections 30 to a signal value correction section 11*a* in the horizontal selector 11.

The signal value correction section 11*a* decides a degree of degradation of the light emission efficiency of the organic EL device in the pixel circuits 10 based on the light amount detection information and carries out a correction process of the signal value Vsig to be applied to the pixel circuits 10 in accordance with a result of the decision.

The light emission efficiency of an organic EL device degrades as time passes. In particular, even if the same current is supplied, the light emission luminance decreases as time passes. Therefore, in the display apparatus according to the present embodiment, the emitted light amount of each pixel circuit 10 is detected and degradation of the light emission luminance is decided based on a result of the detection. Then, the signal value Vsig itself is corrected in response to the degree of degradation. For example, where the signal value Vsig as a certain voltage value V1 is to be applied, correction is carried out such that a correction value α determined based on the degree of degradation of the light emission luminance is set and the signal value Vsig as the voltage value V1+α is applied.

The degradation of the light emission luminance of each pixel circuit 10' detected in such a manner as just described is compensated for by feeding back the same to the signal value Vsig to decrease a screen burn.

Figure 17A:
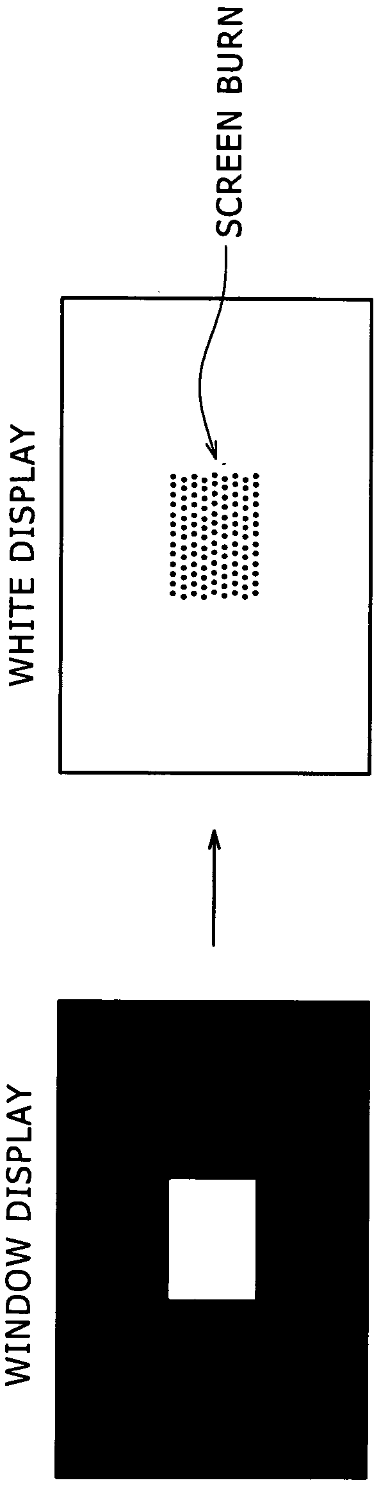
FIGS. 17A and 17B are schematic views illustrating correction against a screen burn.
Figure 17B:
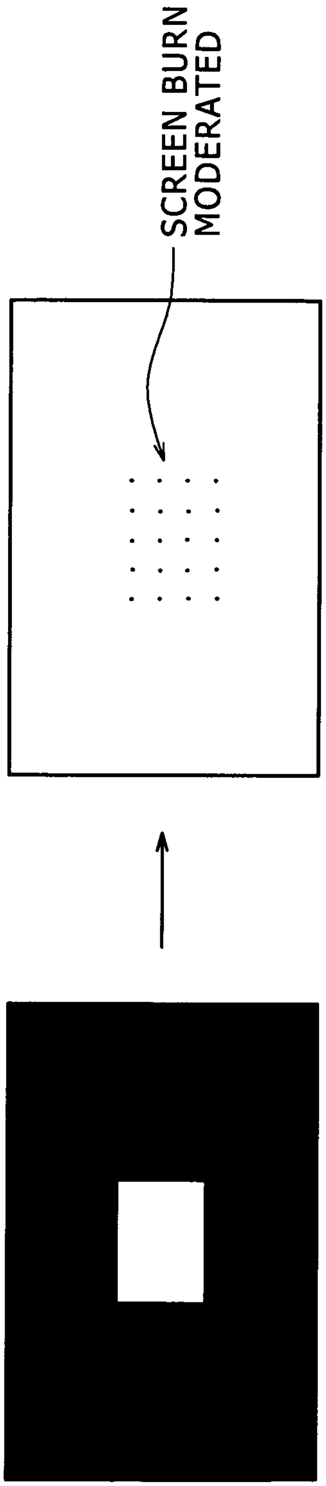

In particular, for example, in a situation wherein a screen burn occurs as seen in FIG. 17A, the screen burn is decreased as seen in FIG. 17B.

Figure 3:
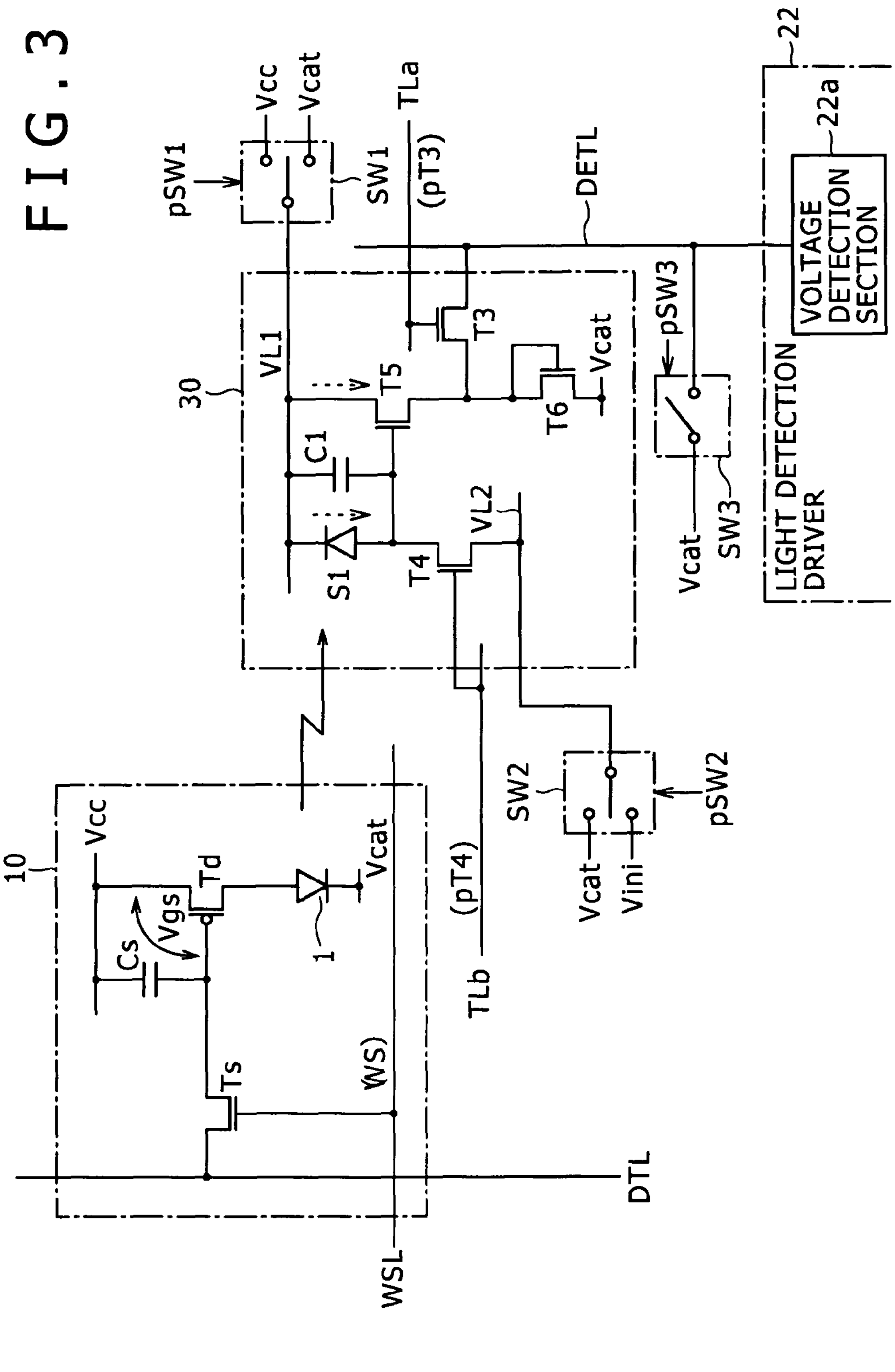
FIG. 3 is a circuit diagram showing a pixel circuit and a light detection section according to an embodiment of the present invention.

It is to be noted that, though not shown in FIG. 1, power supply lines for supplying a required operation power supply voltage therethrough and reference potential lines for supplying a reference potential therethrough are connected to the pixel circuits 10 and the light detection sections 30 while they are shown in FIG. 3

The detection operation control section 21 uses a control signal pSW to carry out also changeover control of potentials for the power supply lines, reference potential lines and so forth to the light detection sections 30.

Incidentally, while a single light detection section 30 is provided for each of the pixel circuits 10, there is no necessity to provide one light detection section 30 for each pixel circuit 10.

Figure 2:
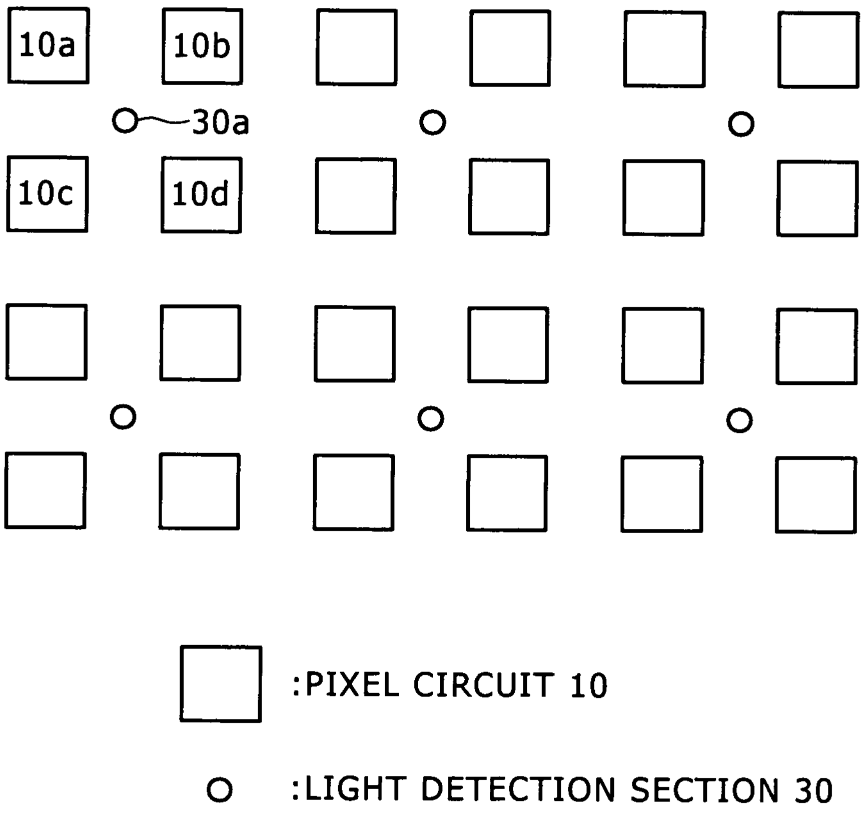
FIG. 2 is a diagrammatic view showing an example of disposition of a light detection section in the display apparatus of FIG. 1.

In other words, another configuration may be applied wherein one light detection section 30 carries out light detection for a plurality of pixel circuits 10, for example, like a configuration shown in FIG. 2 wherein one light detection section 30 is disposed for four pixel circuits 10. For example, such a technique may be taken that, where light detection regarding four pixel circuits 10*a*, 10*b*, 10*c* and 10*d* shown in FIG. 2 is carried out while the pixel circuits 10*a*, 10*b*, 10*c* and 10*d* are successively driven to emit light in order, light detection is carried out successively by a light detection section 30*a* disposed at a central position among the pixel circuits 10*a*, 10*b*, 10*c* and 10*d*. Or another technique may be taken that, while a plurality of pixel circuits 10 are driven to emit light at the same time, the light amount is detected in a unit of a pixel block including, for example, the pixel circuits 10*a*, 10*b*, 10*c* and 10*d*.

[2. Configuration Taken into Consideration in the Course to the Present Invention]

Here, before the circuit configuration and operation of the embodiment of the present invention are described, the light detection section which has been taken into consideration in the course to the present invention is described to facilitate understandings of the present embodiment.

Figure 15:
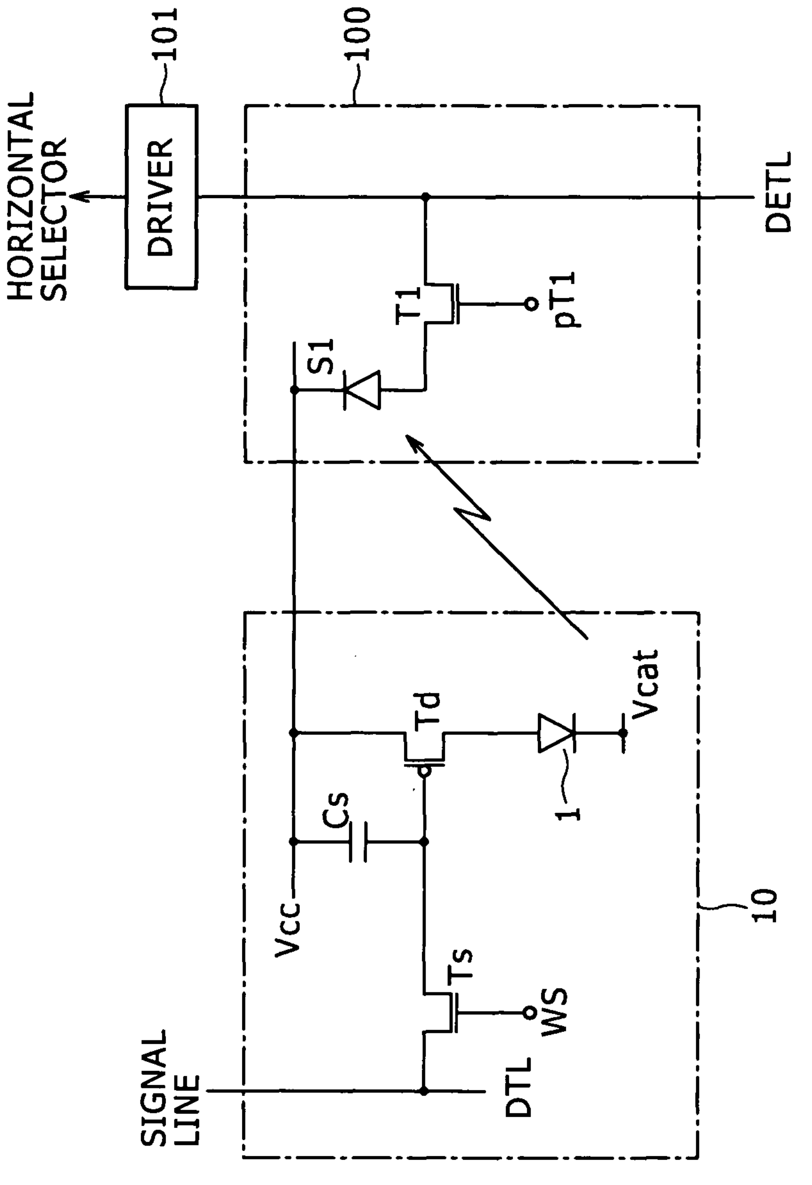
FIG. 15 is a circuit diagram showing a configuration which has been taken into consideration in the course to the present invention.

FIG. 15 shows a pixel circuit 10 and a light detection section 100 contrived for reduction of a screen burn.

Referring to FIG. 3, the pixel circuit 10 includes a driving transistor. Td, a sampling transistor Ts, a holding capacitor Cs and an organic EL element 1. The pixel circuit 10 having the configuration is hereinafter described more particularly.

In order to compensate for a drop of the light emission efficiency of the organic EL element 1 of the pixel circuit 10, the light detection section 100 is provided which includes a light detection element or light sensor S1 and a switching transistor T1 interposed between a fixed power supply voltage Vcc and a light detection line DETL.

In this instance, the light sensor S1, for example, in the form of a photodiode supplies leak current corresponding to the amount of emitted light from the organic EL element 1.

Generally, when a diode detects light, current thereof increases. Further, the increasing amount of current varies depending upon the amount of light incident to the diode. In particular, if the light amount is great, then the increasing amount of current is great, and if the light amount is small, then the increasing amount of current is small.

The current flowing through the light sensor S1 flows to the light detection line DETL if the switching transistor T1 is rendered conducting.

An external driver 101 connected to the light detection line DETL detects the amount of current supplied from the light sensor S1 to the light detection line DETL.

The current value detected by the external driver 101 is converted into a detection information signal and supplied to a horizontal selector 11. The horizontal selector 11 decides from the detection information signal whether or not the detection current value corresponds to the signal value Vsig provided to the pixel circuit 10. If the luminance of the emitted light of the organic EL element 1 indicates a degraded level, then the detection current amount indicates a reduced level. In this instance, the signal value Vsig is corrected.

Figure 16:
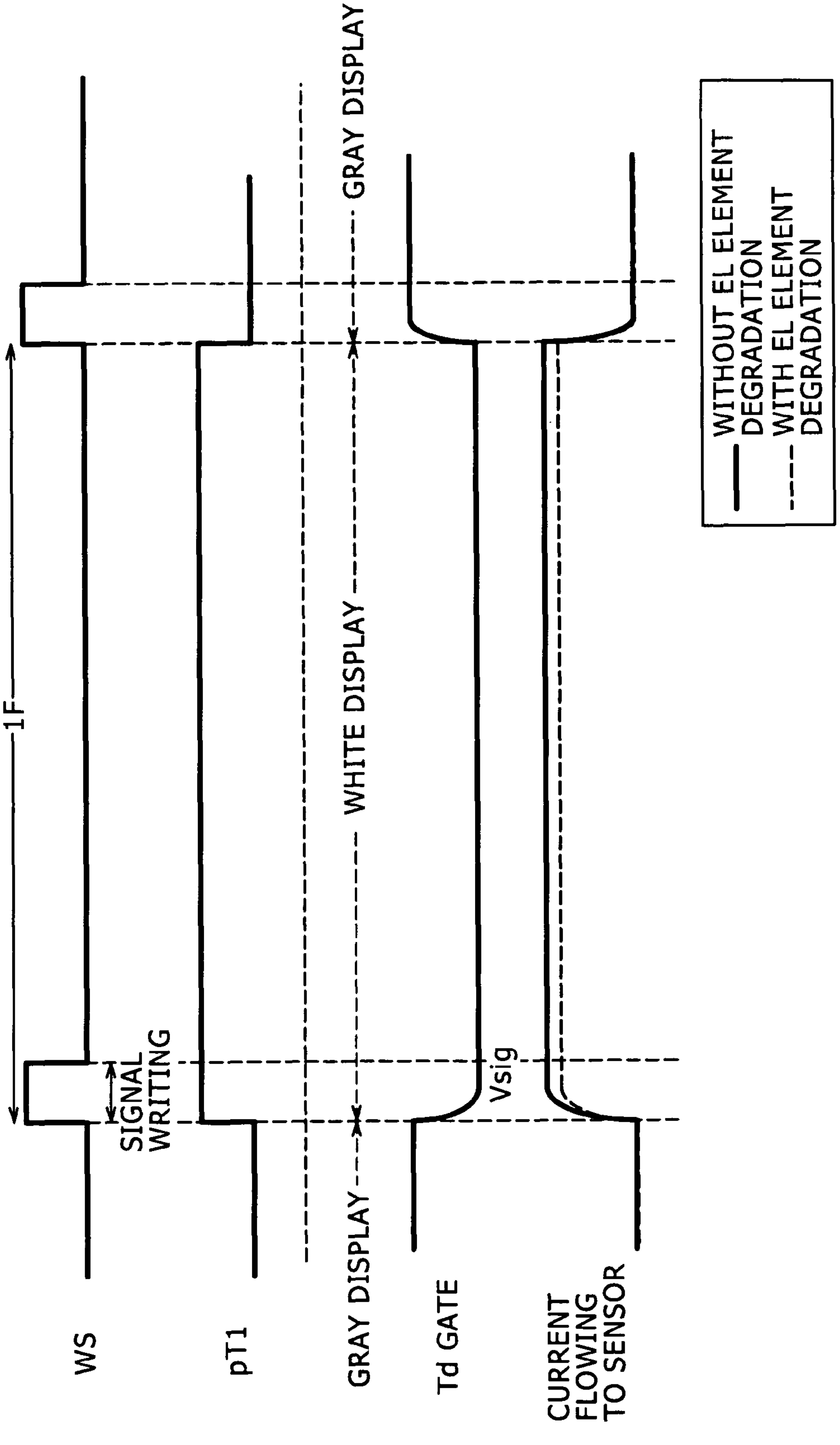
FIG. 16 is a waveform diagram illustrating operation of the circuit of FIG. 15.

A light detection operation waveform is illustrated in FIG. 16. Here, the period within which the light detection section 100 outputs detection current to the external driver 101 is determined as one frame.

Within a signal writing period illustrated in FIG. 16, the sampling transistor Ts in the pixel circuit 10 exhibits an on state with a scanning pulse WS, and the signal value Vsig applied to a signal line DTL from the horizontal selector 11 is inputted to the pixel circuit 10. The signal value Vsig is inputted to the gate of the driving transistor Td and is retained into the holding capacitor Cs. Therefore, the driving transistor Td supplies current corresponding to the gate-source voltage thereof to the organic EL element 1 so that the organic EL element 1 emits light. For example, if the signal value Vsig is supplied for a white display within a current frame, then the organic EL element 1 emits light of the white level within the current frame.

Within the frame within which light of the white level is emitted, the switching transistor T1 in the light detection section 100 is rendered conducting with a control pulse pT1. Therefore, the variation of current of the light sensor S1 which receives the light of the organic EL element 1 is reflected on the light detection line DETL.

For example, if the amount of current flowing through the light sensor S1 thereupon is equal to the amount of light which should originally be emitted and is such as indicated by a solid line in FIG. 16, then if the emitted light amount is reduced by deterioration of the organic EL element 1, then it is such as indicated by a broken line in FIG. 16.

Since a variation of current corresponding to degradation of the luminance of emitted light appears on the light detection line DETL, the external driver 101 can detect the current amount and obtain information of the degree of degradation. Then, the information is fed back to the horizontal selector 11 to correct the signal value Vsig to carry out compensation for the luminance degradation. Accordingly, a screen burn can be decreased.

However, such a light detection system as described above gives rise to the following disadvantage.

In particular, the light sensor S1 receives emitted light of the organic EL element 1 and increases the current thereof. For a diode as the light sensor S1, preferably an off region thereof in which a great current variation is exhibited, that is, an applied voltage of a negative value proximate to zero, is used. This is because the current variation can be detected comparatively precisely.

However, even if the current value at this time indicates an increase, since it is very low with respect to the on current, if it is intended to detect the luminance variation with a high degree of accuracy, then a long period of time may be required for charging the parasitic capacitance of the light detection line DETL. For example, it is difficult to detect a current variation with a high degree of accuracy in one frame.

As a countermeasure, it is a possible idea to increase the size of the light sensor S1 to increase the amount of current. However, as the size increases, the ratio of the area which the light detection section 100 occupies in a pixel array 20 increases.

In the present embodiment, the light detection sections 30 which can detect light with a high degree of accuracy are provided taking the foregoing into consideration.

To this end, a countermeasure is taken for making it possible to output appropriate light amount information to a light detection line DETL even if the size of the light sensor S1 is not increased and besides preventing a characteristic variation of the light sensor S1 and the transistors within a period within which each light detection section 30 does not carry out a detection operation.

[3. Circuit Configuration of the Present Embodiment]

Figure 10:
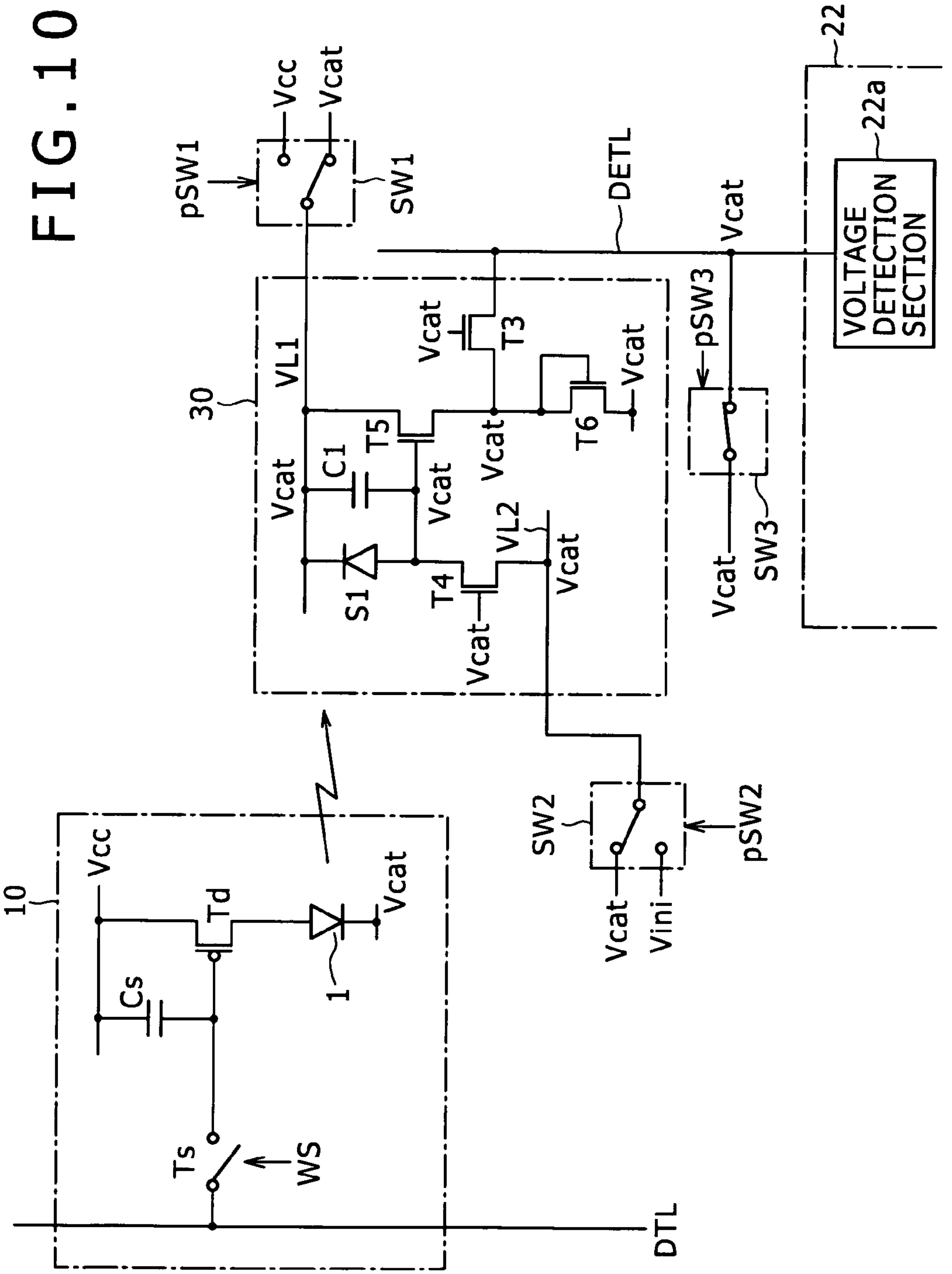
FIG. 10 is a circuit diagram illustrating an initialization state of the pixel circuit and the light detection section of FIG. 2.

A configuration of the pixel circuit 10 and a light detection section 30 of the embodiment shown in FIG. 1 is shown in FIG. 10.

Referring to FIG. 10, the pixel circuit 10 shown includes a sampling transistor Ts in the form of an re-channel TFT, a holding capacitor Cs, a driving transistor Td in the form of a p-channel TFT, and an organic EL element 1.

As seen in FIG. 1, the pixel circuit 10 is disposed at a crossing point between a signal line DTL and a writing control line WSL. The signal line DTL is connected to the drain of the sampling transistor Ts, and the writing control line WSL is connected to the gate of the sampling transistor Ts.

The driving transistor Td and the organic EL element 1 are connected in series between a power supply voltage Vcc and a cathode potential Vcat.

The sampling transistor Ts and the holding capacitor Cs are connected to the gate of the driving transistor Td. The gate-source voltage of the driving transistor Td is represented by Vgs.

In the present pixel circuit 10, when the horizontal selector 11 applies a signal value corresponding to a luminance signal to the signal line DTL, if a write scanner 12 places the scanning pulse WS of the writing control line WSL to the H level, then the sampling transistor Ts is rendered conducting and the signal value is written into the holding capacitor Cs. The signal value potential written in the holding capacitor Cs becomes the gate potential of the driving transistor Td.

If the write scanner 12 places the scanning pulse WS of the writing control line WSL into the L level, then although the signal line DTL and the driving transistor Td are electrically disconnected from each other, the gate potential of the driving transistor Td is held stably by the holding capacitor Cs.

Then, driving current Ids flows to the driving transistor Td and the organic EL element 1 so as to be directed from the power supply voltage Vcc toward the ground potential.

At this time, the driving current Ids exhibits a value corresponding to the gate-source voltage Vgs of the driving transistor Td, and the organic EL element 1 emits light with a luminance corresponding to the current value.

In short, in the pixel circuit 10, the signal value potential is written from the signal line DTL into the holding capacitor Cs to vary the gate application voltage of the driving transistor Td thereby to control the value of current to flow to the organic EL element 1 to obtain a gradation of color development.

Since the driving transistor Td in the form of a p-channel TFT is designed such that it is connected at the source thereof to the power supply voltage Vcc so that the driving transistor Td normally operates within a saturation region thereof, the driving transistor Td serves as a source of constant current which has a value given by the following expression (1):

$$Ids=(1/2)\cdot\mu\cdot(W/L)\cdot Cox\cdot(Vgs-Vth)^2 \quad (1)$$

where Ids is current flowing between the drain and the source of the transistor which operates in its saturation region, μ the mobility, W the channel width, L the channel length, Cox the gate capacitance, and Vth the threshold voltage of the driving transistor Td.

As apparently recognized from the expression (1) above, within the saturation region, the drain current Ids of the driving transistor Td is controlled by the gate-source voltage Vgs. Since the gate-source voltage Vgs of the driving transistor Td is kept fixed, the driving transistor Td operates as a constant current source and can cause the organic EL element 1 to emit light with a fixed luminance.

Generally, the current-voltage characteristic of the organic EL element 1 degrades as time passes. Thus, in the pixel circuit 10, together with a time-dependent variation of the organic EL element 1, the drain voltage of the driving transistor Td varies. However, since the gate-source voltage Vgs of the driving transistor Td is fixed in the pixel circuit 10, a fixed amount of current flows to the organic EL element 1 and the emitted light luminance does not vary. In short, stabilized gradation control can be anticipated.

However, as time passes, not only the driving voltage but also the light emission efficiency of the organic EL element 1 degrades. In other words, even if the same current is supplied to the organic EL element 1, the emitted light luminance of the organic EL element 1 drops together with time. As a result, such a screen burn appears.

Therefore, the light detection section 30 is provided so that correction or compensation corresponding to degradation of the emitted light luminance is carried out.

The detection signal outputting circuit as the light detection section 30 in the present embodiment includes a light sensor S1, a capacitor C1, a detection signal outputting transistor T5 in the form of an re-channel TFT, and a first switching transistor T3, a second switching transistor T4, a transistor T6 as seen in FIG. 3.

The light sensor S1 is connected between the power supply line VL1 and the gate of the detection signal outputting transistor T5.

While the light sensor S1 can be produced usually using a PIN diode or an amorphous silicon element, any element can be used for the light sensor S1 only if the amount of current to flow therethrough is varied by light. In the present embodiment, the light sensor S1 is formed, for example, from a diode connection of a transistor.

The light sensor S1 is disposed so as to detect light emitted from the organic EL element 1. The current of the light sensor S1 increases or decreases in response to the detection light amount. In particular, if the emission light amount of the organic EL element 1 is great, then the current increasing amount is great, but if the emission light amount of the organic EL element 1 is small, then the current increasing amount is small.

The capacitor C1 is connected between the power supply line VL1 and the gate of the detection signal outputting transistor T5.

The detection signal outputting transistor T5 is connected at the drain thereof to the power supply line VL1 and at the source thereof to the switching transistor T3.

The switching transistor T3 is connected between the source of the detection signal outputting transistor T5 and the light detection line DETL. The switching transistor T3 is connected at the gate thereof to the control line TLa so that it is turned on/off in response to a control pulse pT3 of the detection operation control section 21 shown in FIG. 1. When the switching transistor T3 is turned on, the source potential of the detection signal outputting transistor T5 is outputted to the light detection line DETL.

The transistor T6 has a form of a diode connection and is connected between the source of the detection signal outputting transistor T5 and the cathode potential Vcat.

The switching transistor T4 is connected at the drain and the source thereof between the gate of the detection signal outputting transistor T5 and a reference potential line VL2. The switching transistor T4 is turned on/off with a control pulse pT4 supplied from a control line TLb to the gate thereof. When the switching transistor T4 is on, the reference potential line VL2 is inputted to the gate of the switching transistor T5.

A light detection driver 22 includes a voltage detection section 22*a* for detecting the potential of each of the light detection lines DETL. The voltage detection section 22*a* detects a detection signal voltage outputted from the light detection section 30 and supplies the detection signal voltage as emitted light amount information of the organic EL element 1, that is, as information of luminance degradation of the organic EL element 1, to the horizontal selector 11 described hereinabove with reference to FIG. 1, particularly to the signal value correction section 11*a*.

To the power supply line VL1, the power supply voltage Vcc and the cathode potential Vcat are selectively supplied through a switch SW1.

Meanwhile, to the reference potential line VL2, the reference voltage Vini and the cathode potential Vcat are selectively supplied through a switch SW2.

Further, to the light detection line DETL, the cathode potential Vcat is supplied when a switch SW3 is on.

Three switches SW1, SW2 and SW3 are controlled for changeover by control signals pSW1, pSW2 and pSW3 from the detection operation control section 21, respectively.

It is to be noted that, although the potential of the power supply line VL1 is changed over between the power supply voltage Vcc and the cathode potential Vcat by the switch SW1 as an example for explanation, the potential changeover of the power supply line VL1 by the switch SW1 may actually be carried out by internal processing of the detection operation control section 21. In particular, the detection operation control section 21 may be configured so as to supply the power supply voltage Vcc and the cathode potential Vcat to the power supply line VL1 in response to a period. This similarly applies also to potential changeover for the reference potential line VL2, that is, to operation of the switch SW2.

[4. Light Detection Operation Period]

While the light detection operation of detecting the emitted light amount of the organic EL element 1 of the pixel circuit 10 is carried out by the light detection section 30 described hereinabove with reference to FIG. 3, an execution period of the light detection operation and so forth of the light detection section 30 is described here.

Figure 4A:
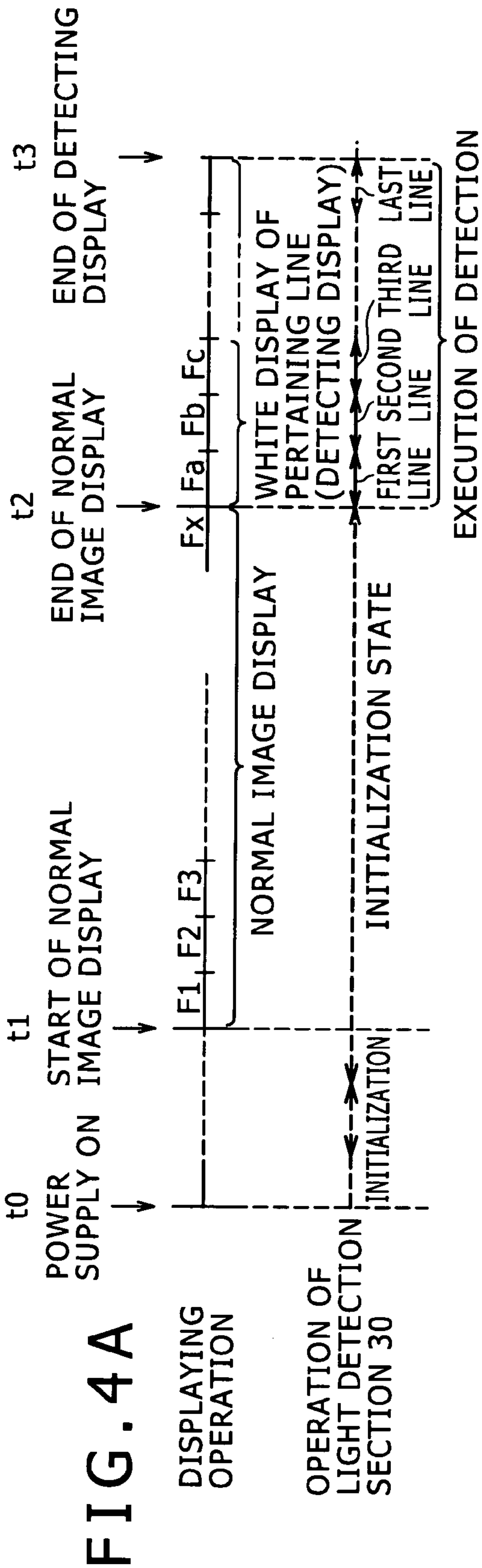
FIGS. 4A, 4B, 5A and 5B are diagrammatic views illustrating a light detection operation period by the light detection section according to an embodiment of the present invention.

FIG. 4A illustrates a light detection operation carried out after a normal image display. It is to be noted that the term "normal image display" used hereinbelow signifies a state wherein a signal value Vsig based on an image signal supplied to the display apparatus is provided to each pixel circuit 10 to carry out an image display of an ordinary dynamic image or still image.

It is assumed that, in FIG. 4A, the power supply to the display apparatus is turned on at time to.

Here, various initialization operations upon turning on of the power supply are carried out before time t1, and a normal image display is started at time t1.

In the case of the present example, the light detection section 30 carries out initialization hereinafter described within a period before ordinary image display is started after the power supply to the apparatus is made available. The initialization signifies an operation for setting all nodes in the light detection section 30 to the same potential, in the present example, to the cathode potential Vcat.

Then, after time t1, a display of frames F1, F2, . . . of video images is executed as the normal image display. In this period, the light detection section 30 keeps the initialization state.

At time t2, the normal image display ends. This corresponds to such a case that, for example, a turning off operation for the power supply is carried out.

In the example of FIG. 4A, the light detection section 30 executes a light detection operation after time t2.

In this instance, the light detection operation is carried out for pixels for one line, for example, within a period of one frame.

For example, when the light detection operation is started, the horizontal selector 11 causes the pixel circuits 10 within a first frame Fa to execute such a display that the first line is displayed by a white display as seen in FIG. 11B. In short, the signal value Vsig is applied to the pixel circuits 10 such that the pixel circuits 10 in the first line carry out a white display, that is, a high luminance gradation display while all of the other pixel circuits 10 execute a black display.

Within the period of the frame Fa, the light detection sections 30 corresponding to the pixels in the first line detect the emitted light amount of the corresponding pixels. The light detection driver 22 carries out voltage detection of the light detection lines DETL of the columns to obtain emitted light luminance information of the pixels in the first line. Then, the emitted light luminance information is fed back to the horizontal selector 11.

Figure 4B:
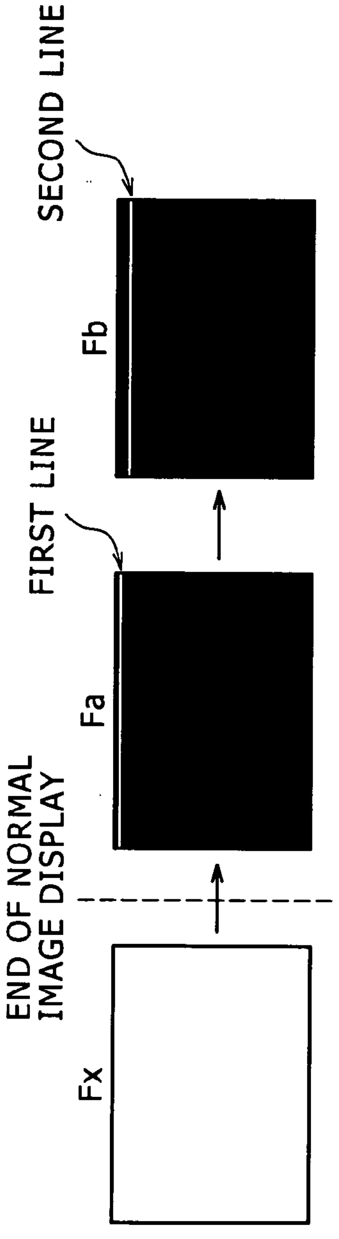

In the next frame Fb, the horizontal selector 11 causes the pixel circuits 10 to execute such a display that a white display is executed in the second line as seen in FIG. 4B. In other words, the horizontal selector 11 causes the pixel circuits 10 in the second line to execute a white display, that is, a high luminance gradation display but causes all of the other pixel circuits 10 to execute a black display.

Within the period of the frame Fb, the light detection sections 30 corresponding to the pixels in the second line detect the emitted light amount of the corresponding pixels. The light detection driver 22 carries out voltage detection of the light detection lines DETL of the columns to obtain emitted light luminance information of the pixels in the second line. Then, the emitted light luminance information is fed back to the horizontal selector 11.

Such a sequence of operations as described above is repeated up to the last line. At a stage wherein emitted light luminance information of the pixels of the last line is detected and fed back to the horizontal selector 11, the light detection operation ends.

The horizontal selector 11 carries out a signal value correction process based on the emitted light luminance information of the pixels.

When the light detection operation described above is completed at time t3, required processes such as, for example, to switch off the power supply to the display apparatus are carried out.

It is to be noted that, while, in the light detection operation for each line, the light detection sections 30 corresponding to the pixels in the line are selected, the selection is carried out with the control pulse pT3 of the detection operation control section 21.

In particular, since the switching transistor T3 is turned on in the light detection sections 30 which correspond to the pixels of the pertaining line, information of the light detection sections 30 in the other lines is not outputted to the light detection lines DETL, and consequently, light amount detection of the pixels of the pertaining line can be carried out.

Figure 5A:
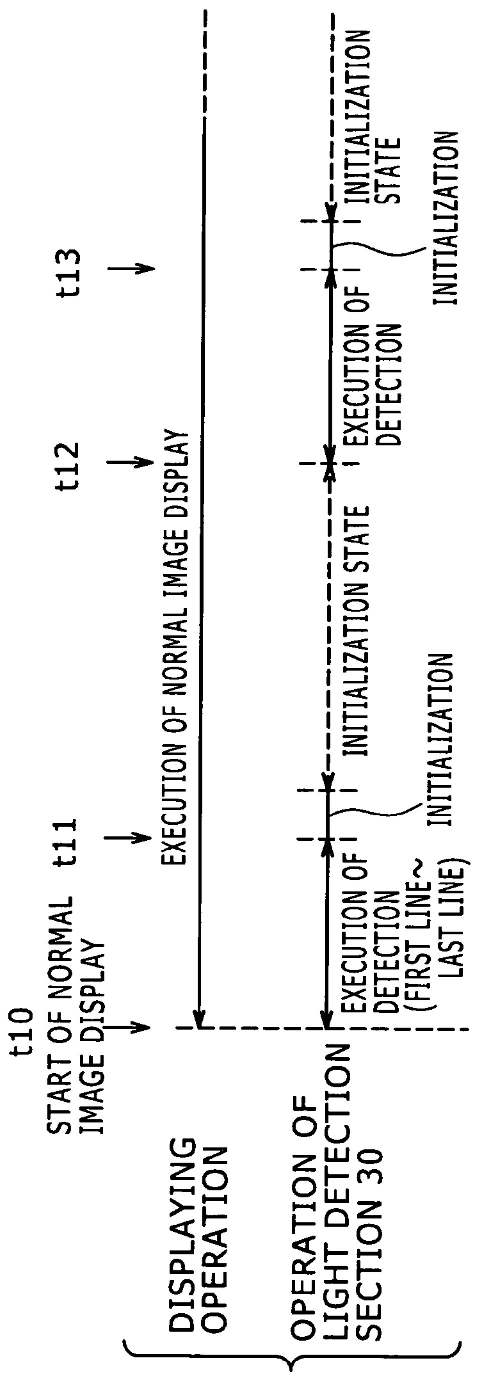

FIG. 5A illustrates a light detection operation carried out in a certain period during execution of the normal image display.

It is assumed that the normal image display is started, for example, at time t10. After the normal image display is started, the light detection operation by the light detection sections 30 is carried out for one line within a period of one frame. In other words, a detection operation similar to that carried out within the period from time t2 to time t3 of FIG. 4A is carried out. However, the display of each pixel circuit 10 is an image display in an ordinary case but is not a display for a light detection operation as in FIG. 4B.

After the light detection operation for the first to last lines is completed, initialization of the light detection section 30 is carried out at time t11. Thereafter, the initialization state is maintained for a predetermined period of time.

The light detection operation is carried out after every predetermined period, and if it is assumed that the timing of a detection operation period comes at certain time t12, then a light detection operation from the first to the last line is carried out similarly. Then, after the light detection operation is completed, initialization of the light detection section 30 is carried out at time t13. Thereafter, the initialization state is maintained for a predetermined period of time.

For example, during execution of the normal image display, the light detection operation may be carried out in parallel in a predetermined period.

Figure 5B:
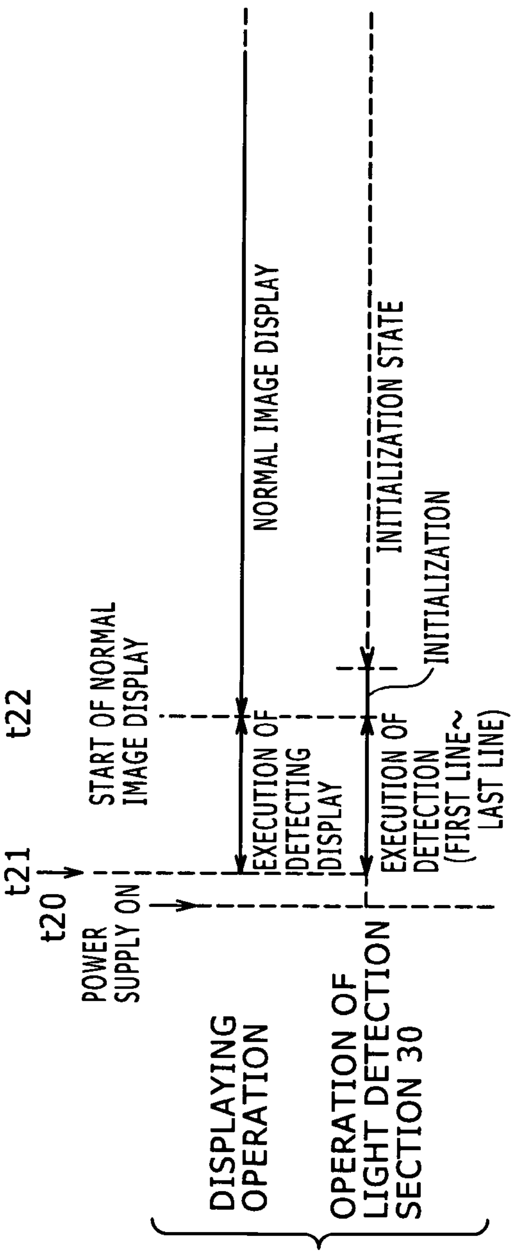

FIG. 5B illustrates a light detection operation carried out when the power supply is turned on.

It is assumed that the power supply to the display apparatus is turned on at time t20. Here, immediately after various initialization operations such as starting up when the power supply is made available are carried out, a light detection operation is carried out from time t21. In particular, a detection operation similar to the operation carried out within the period from time t2 to time t3 of FIG. 4A is carried out. Also each pixel circuit 10 executes a display for a light detection operation for displaying one line by a white display for every one frame as shown in FIG. 4B.

After the light detection operation for the first to the last lines is completed, the horizontal selector 11 causes the pixel circuits 10 to start the normal image display at time t22. Initialization of the light detection section 30 is carried out at time t13. Thereafter, the initialization state is maintained for a predetermined period of time.

For example, if the light detection operation is carried out after the normal image display comes to an end, during execution of the normal image display, before ordinary image display is started or at some other timing as described above and then the signal value correction process based on the detection is carried out, degradation of the emitted light luminance can be coped with.

It is to be noted that the light detection operation may be carried out, for example, at both timings after the normal image display ends and before the ordinary image display is started.

Where the light detection operation is carried out at both or one of the timings after the normal image display ends and before the ordinary image display is started, since such a display for the light detection operation as illustrated in FIG. 4B can be carried out, there is an advantage that the detection can be carried out with emitted light of a high gradation as in the case of the white display. Also it is possible for a display of an arbitrary gradation to be executed to detect a degree of degradation for each gradation.

On the other hand, where the light detection operation is carried out during execution of the normal image display, since the substance of an image being displayed actually is indefinite, it is not possible to specify a gradation to carry out the light detection operation. Therefore, it is necessary to decide a detection value as a value determined taking an emitted light gradation, that is, the signal value Vsig applied then to a pixel of the object of detection into consideration and carry out a signal value correction process. It is to be noted that, since a light detection operation and a correction process can be carried out repetitively during execution of the normal image display, there is an advantage that luminance degradation of the organic EL elements 1 can be coped with substantially normally.

[5. Light Detection Operation and Initialization Operation]

A light detection operation and an initialization operation by the light detection section 30 are described.

First, the light detection operation is described with reference to FIGS. 6 to 9. It is assumed that the light detection operation is carried out, for example, after ordinary image display ends as seen in FIG. 4A.

Figure 6:
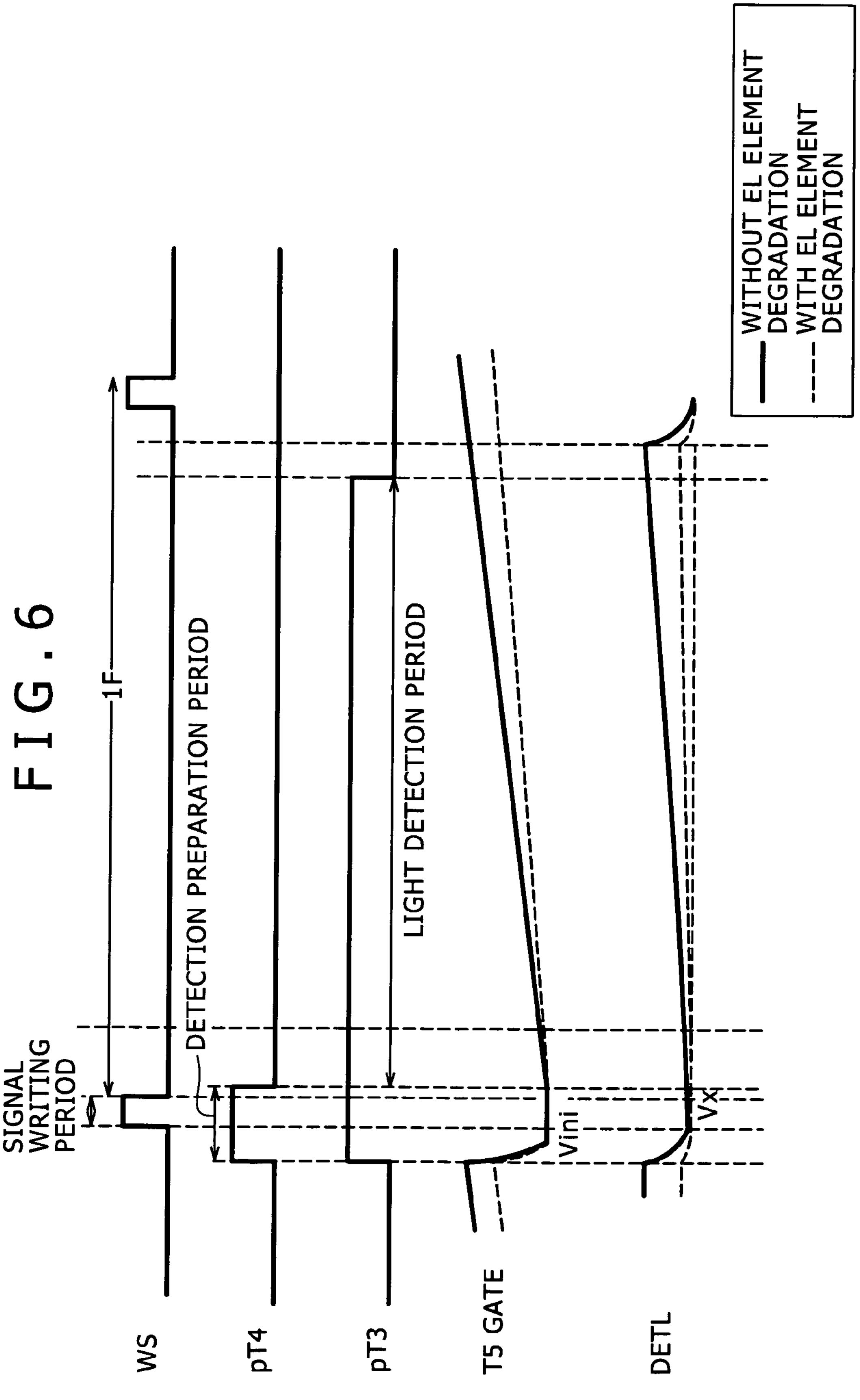
FIG. 6 is a waveform diagram illustrating operation upon light detection by the light detection section according to an embodiment of the present invention.

FIG. 6 illustrates operation waveforms upon light detection operation.

In particular, FIG. 6 illustrates the scanning pulse WS by the write scanner 12, control pulses pT4 and pT3 by the detection operation control section 21, a gate voltage of the detection signal outputting transistor T5 and a voltage appearing on the light detection line DETL.

As described hereinabove with reference to FIGS. 4A and 4B, upon light detection operation, the pixel circuits 10 in one line are driven to execute white light emission within a period of one frame, and emitted light amount detection is carried out by the light detection sections 30 corresponding to the pixel circuits 10. FIG. 6 illustrates a waveform of the scanning pulse WS to one pixel circuit 10 selected as an object of detection and an operation waveform of the light detection section 30 corresponding to the pixel circuit 10.

In the light detection section 30, first as a detection preparation period, the control pulses pT4 and pT3 are set to the H level to turn on the switching transistors T4 and T3, respectively. A state at this time is illustrated in FIG. 7.

Figure 7:
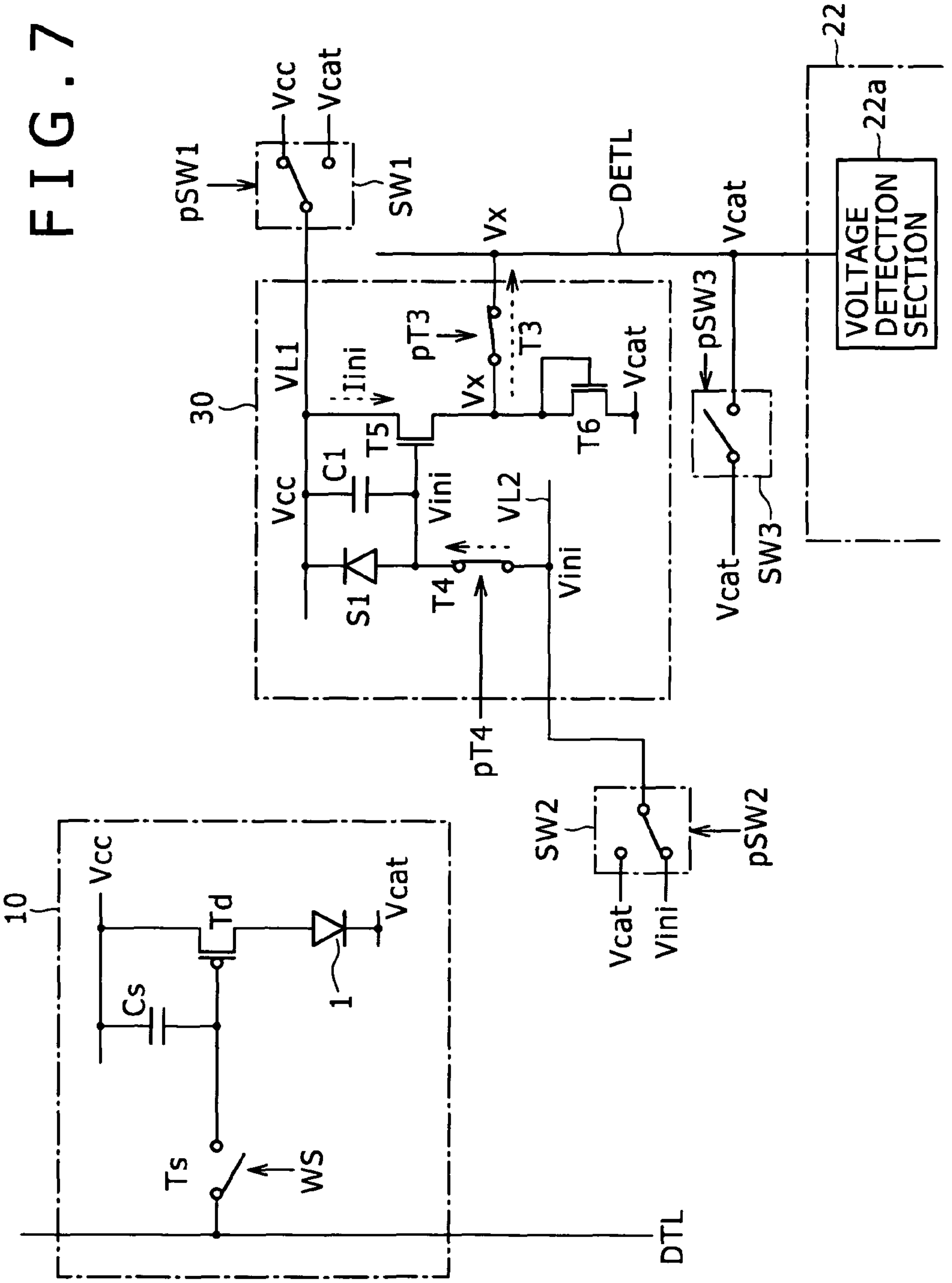
FIGS. 7 to 9 are equivalent circuit diagrams illustrating operation upon light detection by the light detection section according to an embodiment of the present invention.

It is to be noted that, when a detection preparation period is started, the switches SW1, SW2 and SW3 are controlled in such a manner as seen in FIG. 7 with the control signals pSW1, pSW2 and pSW3 from the detection operation control section 21, respectively. In particular, the power supply line VL1 is set to the power supply voltage Vcc and the reference potential line VL2 is set to the reference voltage Vini. Further, the light detection line DETL is disconnected from the cathode potential Vcat.

When the switching transistor T4 is turned on, the reference potential Vini is inputted to the gate of the detection signal outputting transistor T5.

The reference potential Vini is set to a level with which the detection signal outputting transistor T5 and transistor T6 are turned on. In particular, the reference potential Vini is higher than the sum of a threshold voltage VthT5 of the detection signal outputting transistor T5, a threshold voltage VthT6 of the transistor T6 and the cathode potential Vcat, that is, VthT5+VthT6+Vcat. Therefore, since current Iini flows as seen in the figure and also the switching transistor T3 is on, a potential Vx is outputted to the light detection line DETL.

Within the detection preparation period, the gate potential of the detection signal outputting transistor T5=Vini and the potential of the light detection line DETL=Vx are obtained as seen in FIG. 6.

Figure 8:
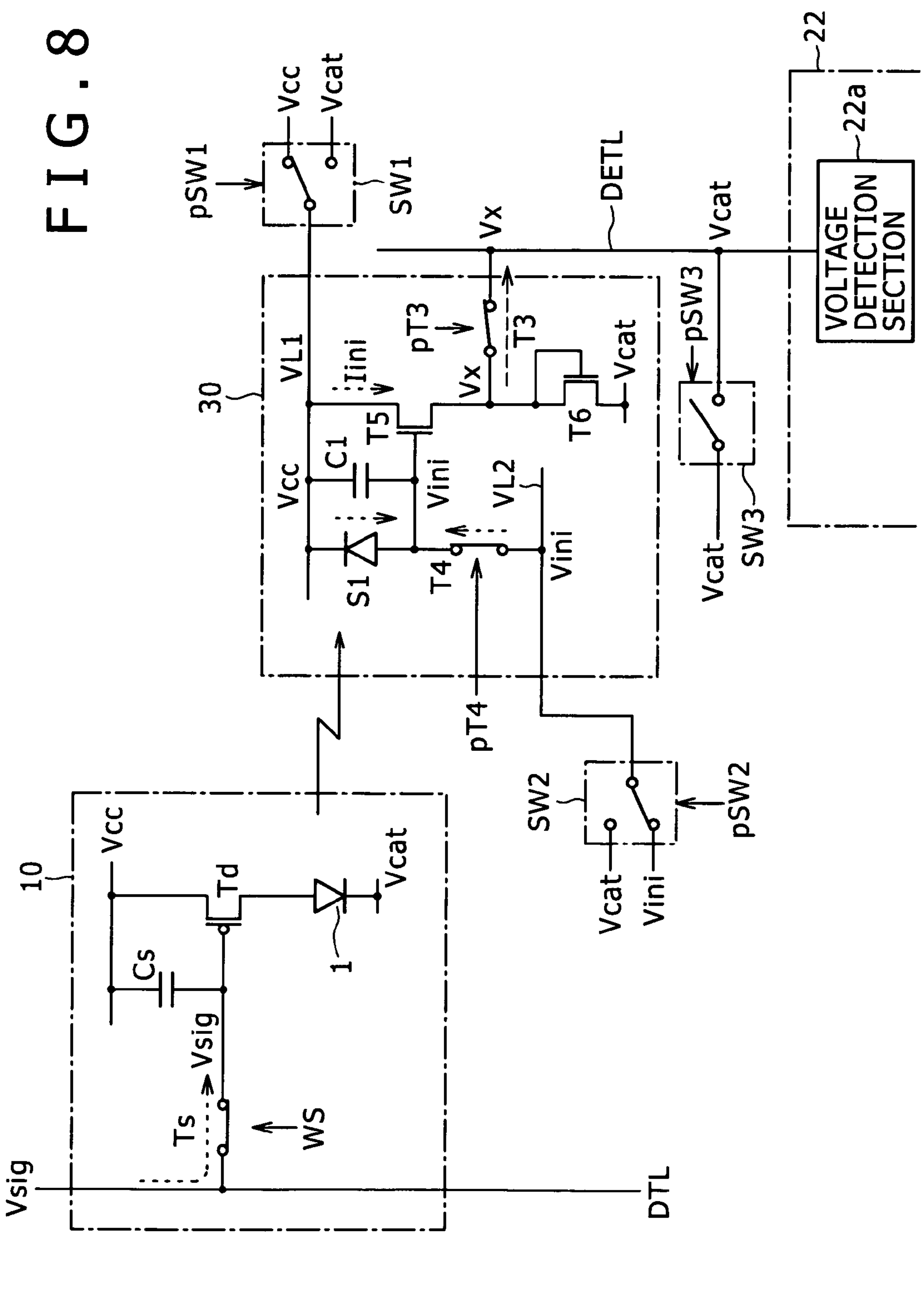

For a display within a period of one frame, signal writing is carried out in the pixel circuit 10. In particular, within the signal writing period of FIG. 6, the write scanner 12 sets the scanning pulse WS for the pixel circuits 10 of the object line to the H level to render the sampling transistor Ts conducting. At this time, the horizontal selector 11 provides the signal value Vsig for a gradation of a white display to the signal line DTL. Consequently, in the pixel circuit 10, the organic EL element 1 emits light of a white gradation. A state at this time is illustrated in FIG. 8.

At this time, the light sensor S1 receives the light emitted from the organic EL element 1 and leak current thereof varies. However, since the switching transistor T4 is in an on state, the gate voltage of the detection signal outputting transistor T5 remains the reference potential Vini.

After the signal writing ends, the write scanner 12 sets the scanning pulse WS to the L level to turn off the sampling transistor Ts.

Figure 9:
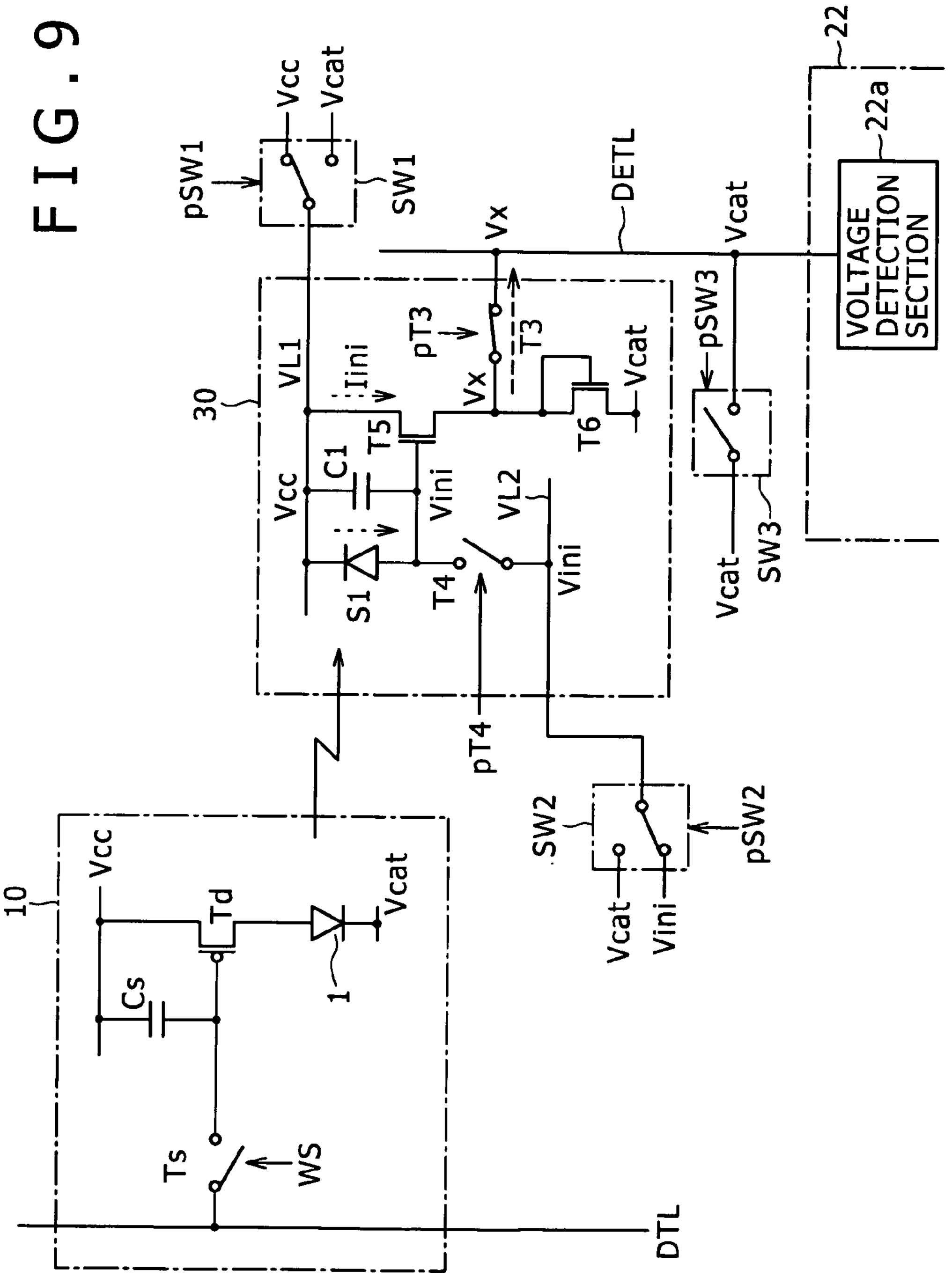

Meanwhile, the detection operation control section 21 sets the control pulse pT4 to the L level to turn off the switching transistor T4. This state is illustrated in FIG. 9.

When the switching transistor T4 is turned off, the light sensor S1 receives the light emitted from the organic EL element 1 and supplies leak current from the power supply voltage Vcc to the gate of the detection signal outputting transistor T5.

By this operation, the gate voltage of the detection signal outputting transistor T5 gradually rises from the reference potential Vini as seen in FIG. 6, and together with this, also the potential of the light detection line DETL rises from the potential Vx. This potential variation of the light detection line DETL is detected by the voltage detection section 201*a*. The detected potential corresponds to the amount of emitted light of the organic EL element 1. In other words, if a particular gradation display such as, for example, a white display is executed by the pixel circuit 10, then the detected potential represents a degree of degradation of the organic EL element 1. For example, the potential difference of the light detection line DETL represented by a solid line in FIG. 6 represents the potential difference when the organic EL element 1 is not degraded at all while the potential difference represented by a broken line in FIG. 6 represents the potential difference when the organic EL element 1 suffers from degradation.

It is to be noted that, since, as the amount of light received by the light sensor S1 increases, the amount of current flowing through the light sensor S1 increases, the detection voltage upon high gradation display such as upon white display is higher than the voltage upon low gradation display. In other words, the high gradation display is more advantageous for accurate detection.

After lapse of a fixed period of time, the detection operation control section 21 sets the control pulse pT3 to the L level to turn off the switching transistor T3 thereby to end the detection operation.

Detection, for example, regarding the pixel circuits 10 in a pertaining line within one frame is carried out in such a manner as described above.

The detection signal outputting circuit of the light detection section 200 has a configuration of a source follower circuit, and if the gate voltage of the detection signal outputting transistor T5 varies, then the variation is outputted from the source of the detection signal outputting transistor T5. In other words, the variation of the gate voltage of the detection signal outputting transistor T5 by variation of leak current of the light sensor S1 is outputted from the source of the detection signal outputting transistor T5 to the light detection line DETL.

Meanwhile, the gate-source voltage Vgs of the detection signal outputting transistor T5 is set so as to be higher than the threshold voltage Vth of the detection signal outputting transistor T5. Therefore, the value of current outputted from the detection signal outputting transistor T5 is much higher than that of the circuit configuration described hereinabove with reference to FIG. 15, and even if the value of current of the light sensor S1 is low, since it passes the detection signal outputting transistor T5, detection information of the emitted light amount can be outputted to the light detection driver 22.

Here, the light sensor S1 and the transistors T3, T4, T5 and T6 which compose the detection signal outputting circuit of the light detection section 30 are studied.

Generally, the threshold voltage and the mobility of a transistor vary in response to a voltage applied thereto, light incident thereto and so forth. In particular, if the transistor is in an on state, then the threshold voltage thereof shifts in the positive direction, but if the transistor is in an off state, then the threshold voltage thereof shifts in the negative direction.

Therefore, the voltage outputted to the external light detection driver 22 sometimes differs in response to a variation of the threshold voltage or the mobility of the transistors which compose the light detection section 30 for carrying out light detection and feedback. In other words, even if the emitted light luminance of the organic EL element 1 is equal, a different voltage may possibly be outputted, resulting in execution of wrong correction against a screen burn.

Further, as shown in FIGS. 4A, 4B, 5A and 5B, after ordinary image display is ended or before ordinary image display is started or else during execution of ordinary image display, a light detection operation is carried out within a predetermined period. In this instance, the period of time within which the light sensor S1 is in an off state becomes very long during execution of ordinary image display during which the organic EL element 1 emits light. Consequently, the threshold voltage or the mobility of the transistors is likely to vary, and the possibility that, even if the emitted light luminance of the organic EL element 1 is equal, a different voltage may be outputted, resulting in execution of wrong correction against a screen burn, becomes higher.

Therefore, in the present embodiment, within a period within which a light detection operation is not carried out, initialization of setting all nodes of the detection signal outputting circuits of the light detection sections 30 to the same potential is carried out.

In other words, the initialization of setting all nodes to the same potential is carried out within a period within which a light detection operation is not carried out as described hereinabove with reference to FIGS. 4A, 4B, 5A and 5B.

The pixel circuit 10 and the light detection section 30 in the initialization state are shown in FIG. 10.

Referring to FIG. 10, upon initialization, the switches SW1, SW2 and SW3 are controlled as seen in FIG. 10 by the control signals pSW1, pSW2 and pSW3 from the detection operation control section 21, respectively. In particular, the power supply line VL1 is set to the cathode potential Vcat and the reference potential line VL2 is set to the cathode potential Vcat. Also the light detection line DETL is set to the cathode potential Vcat.

In the light detection section 30, all of the gate node and the source node of the detection signal outputting transistor T5 and the gate nodes of the switching transistors T3 and T4 are set to the cathode potential Vcat as seen in FIG. 10. This is a state wherein all nodes of the detection signal outputting circuit of the light detection section 30 are initialized to the cathode potential Vcat.

It is to be noted that the cathode potential Vcat is an example of the potential. At least, it is necessary for all nodes to have an equal potential.

In order to implement such an initialization state as described above, the detection operation control section 21 execute control illustrated in FIG. 12 upon the initialization described hereinabove with reference to FIGS. 4A, 4B, 5A and 5B.

Figure 12:
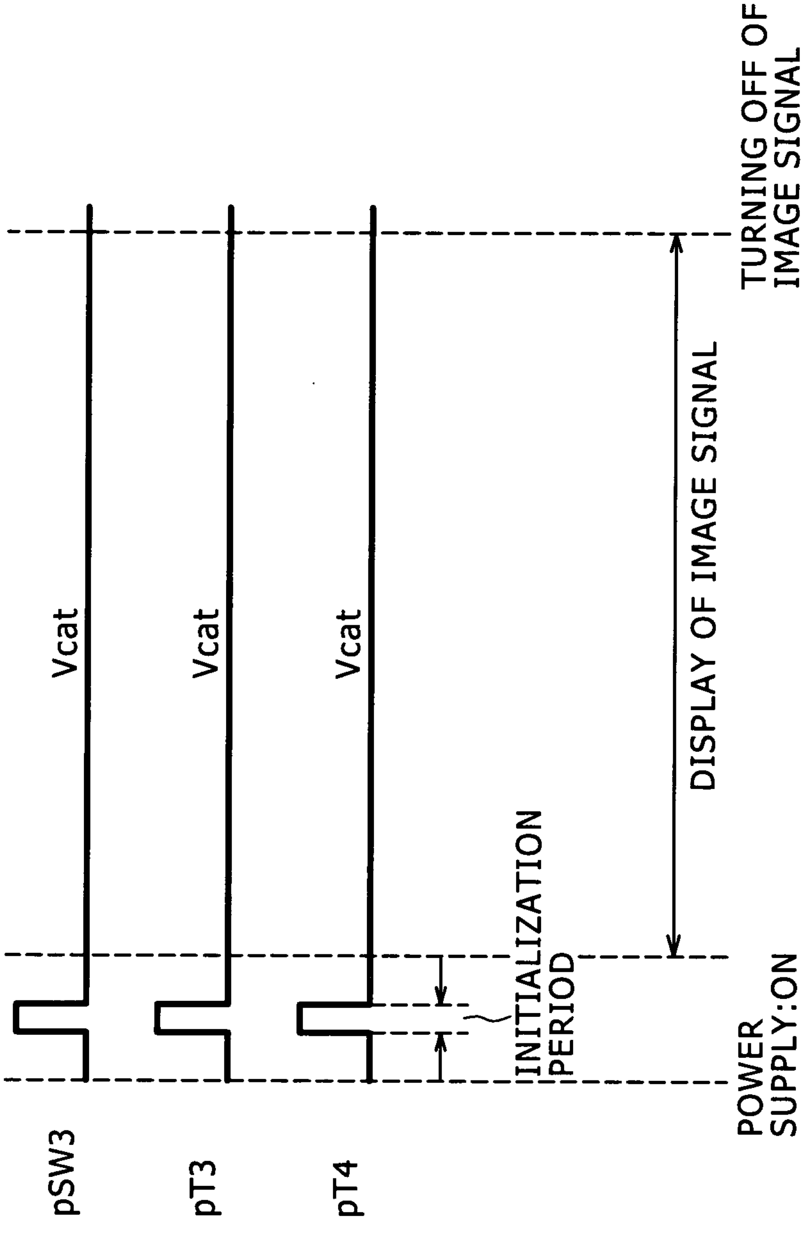
FIG. 12 is a waveform diagram illustrating operation control for establishing the initialization state illustrated in FIG. 10.

In particular, referring to FIG. 12, the switch SW3 is switched on with the control signal pSW3 to set the light detection line DETL to the cathode potential Vcat. It is to be noted that the control signal pSW3 is applied, for example, to the gage of a transistor which forms the switch SW3 while the cathode potential Vcat is set to an off potential as the gate potential for the transistor so that all of the gate, drain and source of the switch SW3 exhibit the cathode potential Vcat.

Further, though not shown, the detection operation control section 21 controls the switches SW1 and SW2 in such a manner as described above to set the power supply line VL1 to the cathode potential Vcat and set the reference potential line VL2 to the cathode potential Vcat.

Then, the control pulses pT4 and pT3 are set to the H level to turn on the switching transistors T4 and T3, respectively. The light detection section 30 in this state is shown in FIG. 11.

Figure 11:
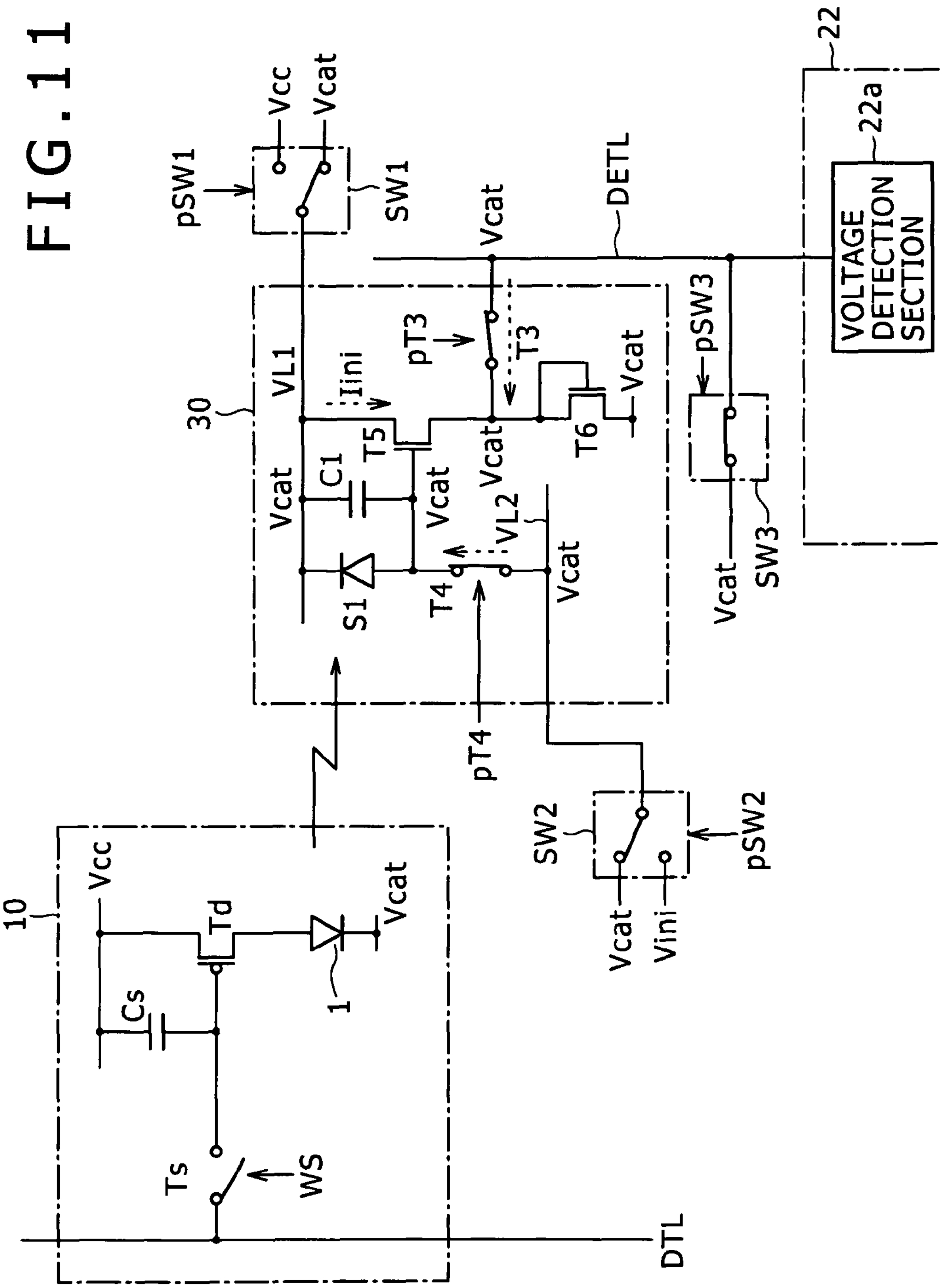
FIG. 11 is an equivalent circuit diagram illustrating operation for establishing the initialization state illustrated in FIG. 10.

Referring to FIG. 11, when the switching transistor T3 is turned on, the cathode potential Vcat applied to the light detection line DETL is inputted to the source node of the detection signal outputting transistor T5.

Further, when the switching transistor T4 is turned on, the cathode potential Vcat applied to the reference potential line VL2 is inputted to the gate node of the detection signal outputting transistor T5.

Thereafter, the detection operation control section 21 sets the control pulses pT4 and pT3 to the L level, that is, to the cathode potential Vcat, as seen in FIG. 12. The cathode potential Vcat is set to the off potential of the switching transistors T3 and T4.

Consequently, also the gate nodes of the switching transistors T3 and T4 are controlled to the cathode potential Vcat. In other words, the state of FIG. 10 is established.

By using such voltage setting as seen in FIG. 10, no voltage is applied to the transistors T3, T4, T5 and T6 and the light sensor S1 within a period within which the light detection section 30 does not operate, and consequently, such electric characteristics as the threshold voltage and the mobility of them exhibit no variation at all within the period.

Therefore, upon light detection operation, such a situation that, even if the emitted light luminance of the organic EL element 1 is equal, a different voltage is outputted as a result of a characteristic variation of the light sensor S1 does not occur.

As described above, in the present embodiment, within a period within which the light detection section 30 does not carry out a light detection operation, no voltage is applied to the transistors T3, T4, T5 and T6 and the light sensor S1 which compose the circuit of the light detection section 30 and the electric characteristics of the components do not vary at all. Consequently, the light detection operation is carried out regularly, and correction against a screen burn can be carried out regularly. Therefore, uniform picture quality free from a screen burn can be obtained.

Further, since electric characteristic of the transistors T3, T4, T5 and T6 and the light sensor S1 do not vary, there is no necessity to additionally provide a circuit configuration for compensation for a characteristic variation, and the number of elements of the light detection section 30 does not increase. Therefore, a high yield can be implemented.

[6. Modifications]

While the embodiment of the present invention has been described above, the present invention is not limited to the specific embodiment but can be carried out in various modified forms.

Figure 13:
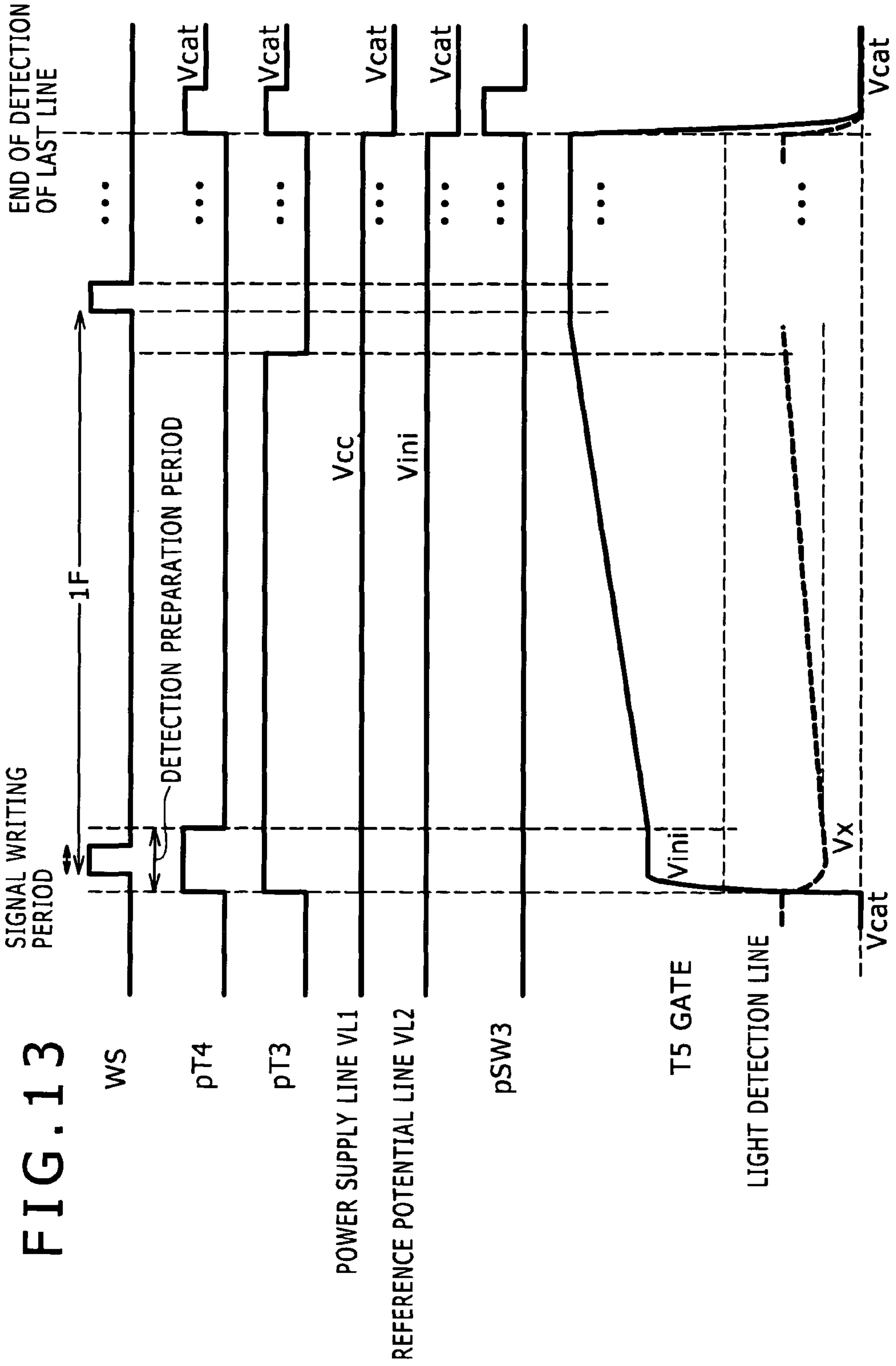
FIG. 13 is a waveform diagram illustrating another example of operation of the light detection section of FIG. 2.

For example, where a light detection operation is carried out in a predetermined period during ordinary image display as seen in FIG. 5A, such operation waveforms as illustrated in FIG. 13 may be used.

In particular, referring to FIG. 13, when a light detection operation is carried out during execution of ordinary image display, the power supply line VL1 is set to the power supply voltage Vcc and the reference potential line VL2 is set to the reference voltage Vini.

Then, in the light detection section 30 corresponding to an object pixel within a detection preparation period, the switching transistors T3 and T4 are turned on with the control pulses pT3 and pT4, respectively, to establish the state described hereinabove with reference to FIG. 7. It is to be noted that the scanning pulse WS in FIG. 13 is used to execute line scanning for the pixel circuits 10 for ordinary display.

Then, after the signal value Vsig is written into the pixel circuit 10 by the line scanning and the pixel circuit 10 starts emission of light as seen in FIG. 8, the switching transistor T4 is turned off to establish the state described hereinabove with reference to FIG. 9 to carry out a light detection operation in a similar manner as described above.

Such a sequence of operations as described above are carried out as light detection for one line, for example, within a period of one frame, and after the light detection operation for the last line is completed, the power supply line VL1 is set to the cathode potential Vcat and also the reference potential line VL2 is set to the cathode potential Vcat. Then, the switching transistors T3 and T4 are turned on to input the cathode potential Vcat to the light detection section 30. Thereafter, also the control pulses pT4 and pT3 to be applied to the gate of the switching transistors T4 and T3, respectively, are set to the cathode potential Vcat. Consequently, the initialization state is established. This state may be maintained until a next light detection operation is started.

Figure 14:
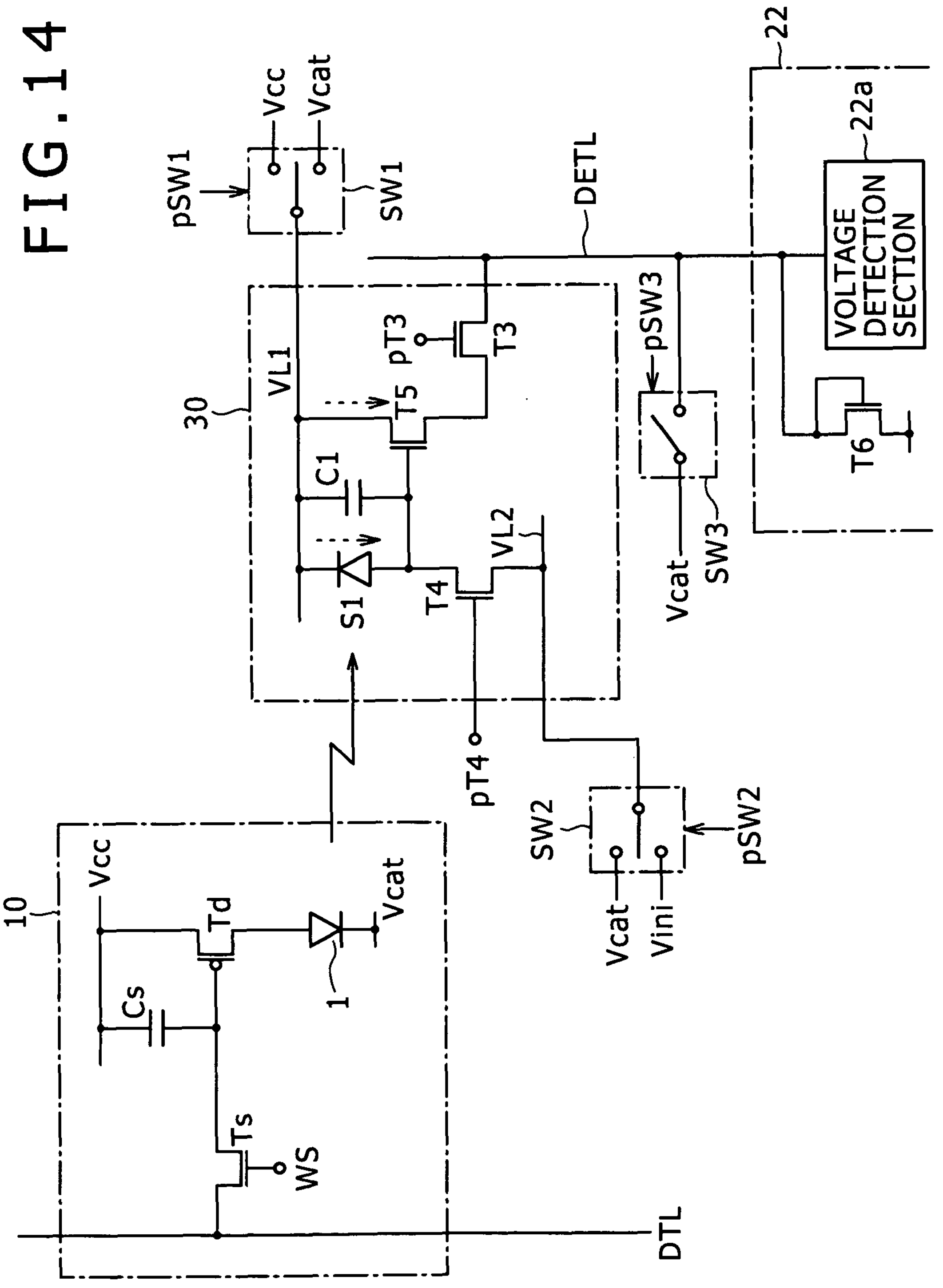
FIG. 14 is a circuit diagram showing a pixel circuit and a light detection section according to another embodiment of the present invention.

FIG. 14 shows a modification to the circuit configuration of the light detection section 30.

Referring to FIG. 14, in the modified light detection section 30, the transistor T6 is connected not to each light detection section 30 but to the light detection line DETL to which the light detection sections are connected. In other words, the transistor T6 is removed from each light detection section 30. By the configuration described, the light detection section 30 is simplified in configuration, and reduction of the number of elements and simplification of the arrangement configuration in the pixel array 20 are achieved.

Further, the configuration of the pixel circuit 10 is not at all limited to the examples described hereinabove, and various other configurations may be adopted. In particular, the present embodiment described above can be applied widely to display apparatus which adopt a pixel circuit which carries out a light emitting operation irrespective of the configuration of the pixel circuit described above with reference to FIG. 10 and include a light detection section provided outside the pixel circuit for detecting the emitted light amount of the pixel circuit.

The present application contains subject matter related to that disclosed in Japanese Priority Patent Application JP 2009-115194 filed in the Japan Patent Office on May 12, 2009, the entire contents of which are hereby incorporated by reference.

While preferred embodiments of the present invention have been described using specific terms, such description is for illustrative purpose only, and it is to be understood that changes and variations may be made without departing from the spirit or scope of the following claims.

What is claimed is:

1. A display apparatus, comprising:

a plurality of pixel circuits disposed in a display area in a matrix form and each including a light emitting element;

a light emission driving section configured to selectively apply a video signal to the plurality of pixel circuits and to cause the plurality of pixel circuits to emit light of gradations corresponding to values of the video signal respectively applied thereto;

a light detection driving section configured to control a light detection operation of at least one light detection unit, where the light detection unit is configured to perform the light detection operation, which includes: detecting light emitted from the light emitting element of at least one of the plurality of pixel circuits corresponding to the light detection unit, generating light detection information corresponding to an amount of light detected, and outputting a detection signal corresponding to the generated light detection information to a detection line;

a correction information production section configured to receive the detection signal, generate correction information for correction of a value of the video signal based on the detection signal, and supply the generated correction information to the light emission driving section; and an initialization control section configured to perform an initialization operation comprising causing all nodes of the at least one light detection unit to have an equal potential during an initialization period, the initialization period occurring in a frame period in which the light detection operation is not being performed, where the nodes of the at least one light detection unit include all electrodes of each element included in the at least one light detection unit.

2. The display apparatus of claim 1, further comprising:

a plurality of light detection units, including the at least one light detection unit, disposed in the display area, wherein each of the plurality of light detection units is configured to perform the light detection operation, each of the plurality of pixel circuits corresponds to one of the plurality of light detection units, and the initialization control section is configured to perform the initialization operation for each of the plurality of light detection units during the initialization period.

3. The display apparatus of claim 2, wherein the plurality of pixel circuits correspond on a one-to-one bases to the plurality of light detection units.

4. The display apparatus of claim 2, wherein the plurality of pixel circuits are grouped into groups of N≥2 pixel circuits, and wherein those pixel circuits of a same group correspond to a same one of the plurality of light detection units.

5. The display apparatus of claim 1, wherein, after the initialization operation is performed, all nodes of the at least one light detection unit are maintained at an equal potential throughout the initialization period, and the initialization period extends until a next timing that a light detection operation is performed.

6. The display apparatus of claim 1, wherein, during execution of normal image display, the initialization operation is performed during every initialization period and the initialization period occurs whenever a light detection operation is not being performed.

7. The display apparatus of claim 6 wherein, during execution of normal image display, whenever the initialization operation is performed, thereafter all nodes of the at least one light detection unit are maintained at an equal potential throughout the initialization period during which the initialization operation is performed, and each initialization period extends until a next timing that a light detection operation is performed.

8. The display apparatus of claim 1, wherein the at least one light detection unit includes:

a light sensor for detecting the light emitted from the light emitting element of the at least one of the pixel circuits corresponding to the light detection unit and for generating the light detection information, and a detection signal outputting transistor for generating the detection signal.

9. The display apparatus of claim 8, wherein the at least one light detection unit further includes:

a first switching transistor for connecting an output terminal of the detection signal outputting transistor to the detection line; and a second switching transistor for setting a gate potential of the detection signal outputting transistor to a reference potential by connecting a gate node of the detection signal outputting transistor to a reference potential supply line.

10. The display apparatus of claim 9, wherein a power supply terminal of the detection signal outputting transistor is connected to a power supply line, and the initialization operation includes:

setting a potential of the power supply, a potential of the reference potential supply line, and a potential of the detection line to a first potential, setting a potential of the gate node of the detection signal outputting transistor to the first potential by turning on the second switching transistor, and setting a potential of the output terminal of the detection signal outputting transistor to the first potential by turning on the first switching transistor, and after setting a potential of the gate node of the detection signal outputting transistor to the first potential by turning on the second switching transistor and setting a potential of the output terminal of the detection signal outputting transistor to the first potential by turning on the first switching transistor, setting potentials of control lines that control the first and second switching transistors to the first potential.

11. The display apparatus of claim 10, wherein each of the pixel circuits includes an organic electroluminescence light emitting element as the light emitting element, and the first potential is equal to a cathode potential of the organic electroluminescence light emitting element.

12. The display apparatus of claim 1, wherein the light detection driving section is configured to cause the at least one light detection unit to perform the light detection operation during one of:

a period between powering on of the display apparatus and execution of normal image display, and a period after execution of normal image display is ended.

13. The display apparatus of claim 1, wherein the light detection driving section is configured to cause the at least one light detection unit to perform the light detection operation during execution of normal image display.

14. The display apparatus of claim 13, wherein the light detection operation is performed repeatedly throughout execution of normal image display with a predetermining timing between each light detection operation.

15. A display apparatus, comprising:

a plurality of pixel circuits disposed in a display area in a matrix form and each including a light emitting element;

a light emission driving section configured to selectively apply a video signal to the plurality of pixel circuits and to cause the plurality of pixel circuits to emit light of gradations corresponding to values of the video signal respectively applied thereto;

a light detection driving section configured to control a light detection operation of at least one light detection unit, where the light detection unit includes a plurality of transistors and is configured to perform the light detection operation, which includes: detecting light emitted from the light emitting element of at least one of the plurality of pixel circuits corresponding to the light detection unit, generating light detection information corresponding to an amount of light detected, and outputting a detection signal corresponding to the generated light detection information to a detection line;

a correction information production section configured to receive the detection signal, generate correction information for correction of a value of the video signal based on the detection signal, and supply the generated correction information to the light emission driving section; and an initialization control section configured to perform an initialization operation comprising causing each electrode of each of the plurality of transistors of the at least one light detection unit to have an equal potential during an initialization period, the initialization period occurring in a frame period in which the light detection operation is not being performed, where the nodes of the at least one light detection unit include all electrodes of each element included in the at least one light detection unit.

16. A method of controlling a light detection operation of a display apparatus, the method comprising:

causing ones of a plurality of pixel circuits to emit light of gradations corresponding to values of a video signal respectively applied thereto, the plurality of pixel circuits being disposed in a display area of the display apparatus in a matrix form, each including a light emitting element;

causing at least one light detection unit to perform a light detection operation, which includes: detecting light emitted from the light emitting element of at least one of the plurality of pixel circuits corresponding to the light detection unit, generating light detection information corresponding to an amount of light detected, and outputting a detection signal corresponding to the generated light detection information to a detection line;

causing a correction information production section to receive the detection signal, generate correction information for correction of a value of the video signal based on the detection signal, and supply the generated correction information to a light emission driving section; and performing an initialization operation comprising causing all nodes of the at least one light detection unit to have an equal potential during an initialization period, the initialization period occurring in a frame period in which the light detection operation is not being performed, where the nodes of the at least one light detection unit include all electrodes of each element included in the at least one light detection unit.

* * * * *

UNITED STATES PATENT AND TRADEMARK OFFICE

CERTIFICATE OF CORRECTION

PATENT NO. : 8,605,066 B2
APPLICATION NO. : 12/662307
DATED : December 10, 2013
INVENTOR(S) : Tetsuro Yamamoto et al.

It is certified that error appears in the above-identified patent and that said Letters Patent is hereby corrected as shown below:

On the Title Page, Item (56) References Cited,

Foreign Patent Documents section:

Reference "JP 2007-5019543" should be listed as --JP 2007-501953--.

Signed and Sealed this
Eighteenth Day of November, 2014

Michelle K. Lee
*Deputy Director of the United States Patent and Trademark Office*